(12) United States Patent  
Davenport

(10) Patent No.: US 10,111,035 B2  
(45) Date of Patent: Oct. 23, 2018

(54) REAL-TIME PROXIMITY TRACKING USING RECEIVED SIGNAL STRENGTH INDICATION

(71) Applicant: Isaac Davenport, Longmont, CO (US)

(72) Inventor: Isaac Davenport, Longmont, CO (US)

(*) Notice: Subject to any disclaimer, the term of this patent is extended or adjusted under 35 U.S.C. 154(b) by 100 days.

(21) Appl. No.: 15/283,474

(22) Filed: Oct. 3, 2016

(65) Prior Publication Data

US 2018/0098193 A1    Apr. 5, 2018

(51) Int. Cl.
| | |
|---|---|
| H04W 8/18 | (2009.01) |
| H04W 4/02 | (2018.01) |
| H04B 17/318 | (2015.01) |
| H04W 4/06 | (2009.01) |
| H04B 17/27 | (2015.01) |

(52) U.S. Cl.
CPC ............ *H04W 4/023* (2013.01); *H04B 17/27* (2015.01); *H04B 17/318* (2015.01); *H04W 4/06* (2013.01)

(58) Field of Classification Search
CPC . G08B 13/22; G08B 21/0247; H04M 1/7253; Y02D 70/26; Y02D 70/166; Y02D 70/142; Y02D 70/144; Y02D 70/164
USPC ............... 370/310–328, 336–342, 242–254; 455/457–522
See application file for complete search history.

(56) References Cited

U.S. PATENT DOCUMENTS

| | | | |
|---|---|---|---|
| 4,857,030 A | 8/1989 | Rose | |
| 5,147,237 A | 9/1992 | Kwan et al. | |
| 5,358,259 A | 10/1994 | Best | |
| 5,746,602 A | 5/1998 | Kikinis | |
| 5,805,784 A | 9/1998 | Crawford | |
| 6,227,931 B1 | 5/2001 | Shackelford | |
| 6,309,275 B1 | 10/2001 | Fong et al. | |
| 6,631,351 B1 | 10/2003 | Ramachandran et al. | |
| 6,648,719 B2 | 11/2003 | Chan | |
| 7,252,572 B2 | 8/2007 | Wright et al. | |
| 7,297,044 B2 | 11/2007 | Small et al. | |
| 8,082,499 B2 | 12/2011 | Hudson et al. | |
| 8,144,640 B2 * | 3/2012 | Bims .................... | H04W 64/00 370/315 |
| 8,172,637 B2 | 5/2012 | Brown | |
| 8,540,546 B2 | 9/2013 | Lipman | |
| 8,774,041 B2 * | 7/2014 | Akay ................. | H04W 52/0245 370/252 |
| 8,795,022 B2 | 8/2014 | Lipman et al. | |
| 8,827,761 B2 | 9/2014 | Lipman et al. | |
| 9,196,139 B2 * | 11/2015 | Gutierrez ............... | G08B 13/22 |
| 9,349,282 B2 * | 5/2016 | Luna ..................... | H04R 3/00 |
| 9,888,384 B2 * | 2/2018 | Weksler ................ | H04W 12/06 |
| 2003/0003839 A1 | 1/2003 | Lin | |

(Continued)

*Primary Examiner* — Man U Phan

(74) *Attorney, Agent, or Firm* — MP Patents, LLC

(57) ABSTRACT

A method for proximity tracking includes broadcasting a first advertising packet from a first broadcasting transceiver, receiving the first advertising packet at a plurality of second transceivers and, for each of the plurality of second transceivers, recording a received signal strength indication value of the first advertising packet received. A subsequent advertising packet is formed to include the received signal strength indication value recorded by at least one of the plurality of second transceivers and broadcast from at least one of the plurality of second transceivers. A system is provided with performs actions of the method to track proximity in real time.

14 Claims, 20 Drawing Sheets

(56) References Cited

U.S. PATENT DOCUMENTS

| | | |
|---|---|---|
| 2010/0041304 A1 | 2/2010 | Eisenson |
| 2013/0288563 A1 | 10/2013 | Zheng et al. |
| 2014/0032467 A1 | 1/2014 | Reddy et al. |
| 2014/0032471 A1 | 1/2014 | Reddy et al. |
| 2014/0170929 A1 | 6/2014 | Lipman |
| 2014/0323048 A1* | 10/2014 | Kang .................... H04W 4/008 455/41.2 |
| 2016/0007289 A1* | 1/2016 | Weizman .......... H04W 52/0229 370/311 |
| 2016/0050526 A1* | 2/2016 | Liu ........................ H04W 4/70 455/457 |
| 2017/0150533 A1* | 5/2017 | Alipour ................ H04W 76/10 |
| 2017/0289814 A1* | 10/2017 | Kaushik ................ H04W 12/12 |

* cited by examiner

REAL-TIME PROXIMITY TRACKING USING RECEIVED SIGNAL STRENGTH INDICATION

SUMMARY

The present disclosure seeks to provide a method for state tracking, which includes broadcasting a first advertising packet from a first transceiver; receiving, by a plurality of second transceivers, the first advertising packet; for each of the plurality of second transceivers, recording a received signal strength indication value of the first advertising packet received; forming a subsequent advertising packet comprising the received signal strength indication value recorded for at least one of the plurality of second transceivers; and broadcasting the subsequent advertising packet from the at least one of the plurality of second transceivers.

The present disclosure also seeks to provide a system for state tracking, including a first transceiver configured to broadcast a first advertising packet; a plurality of second transceivers each configured to receive the first advertising packet and to broadcast subsequent advertising packets and a memory configured to record, for each of the plurality of second transceivers, a received signal strength indication value of the first advertising packet received. The system also includes a plurality of processors configured to form the subsequent advertising packets so as to comprise the received signal strength indication value recorded by at least one of the plurality of second transceivers.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

Figure 1:
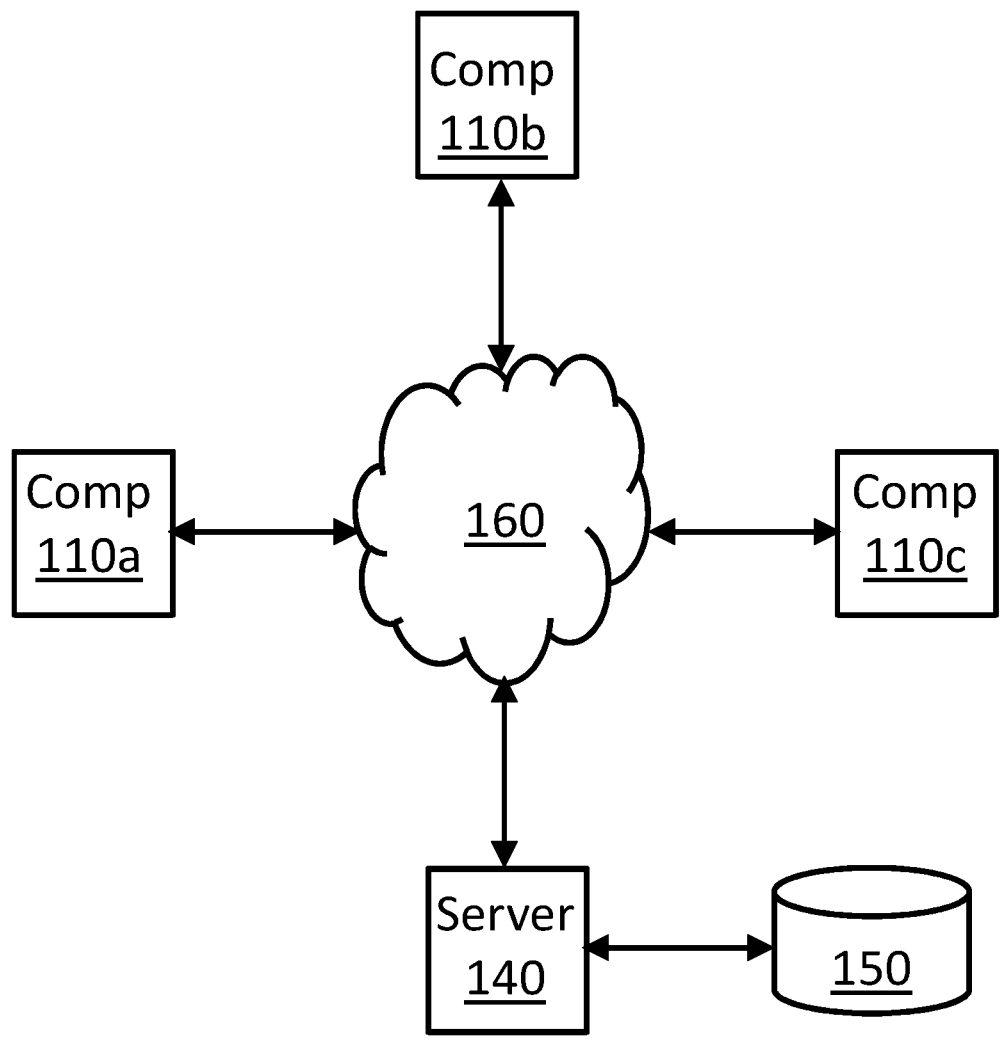
FIG. 1 schematically illustrates an example network environment that is suitable for facilitating disclosed systems and methods.

The following detailed description illustrates embodiments of disclosed state tracking services and manners by which they may be implemented. Although the best mode of carrying out the state tracking services has been disclosed, those skilled in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Embodiments of the present disclosure provide a method for state tracking, including broadcasting advertising packets from each of a plurality of transceivers and at each of the plurality of transceivers, listening for the advertising packages or advertising packets of other transceivers wherein the advertising packets of each transceiver includes a programmable/customizable data payload. Advertising packets may include received signal strength indication (RSSI) values for observed advertising packets from other transceivers. RSSI values observed between two or more transceivers can be interpreted as a proximity state or affinity state existing between the transceivers. For example, observed RSSI values may be affected by changing relative proximity of the transceivers, relative orientation of the transceivers or both. With RSSI from the advertising packets, a real-time proximity matrix or real-time affinity matrix may be assembled to contain the relative proximity or affinity of each transceiver to each other transceiver. Filtering may be used to enhance the accuracy of the proximity or affinity state determination. As disclosed throughout, some actions of the method may be computer-implemented. Furthermore, disclosed state tracking methods may be implemented and state tracking services may be provided in accordance with disclosed state tracking systems.

Methods and systems in accordance with the disclosure employ a novel "connectionless" model between transceivers to generate a real-time state matrix data stream comprised of RSSI values representing proximity data, affinity data or a combination thereof.

Embodiments of the present disclosure substantially eliminate, or at least partially address, problems in the prior art, thus enabling creation and transmission of a sequence of state vectors.

Additional aspects, advantages, features and objects of the disclosed systems and methods will be made apparent from the drawings and the detailed description of the illustrative embodiments construed in conjunction with the appended claims that follow.

It will be appreciated that features of the disclosed state tracking service are susceptible to being combined in various combinations without departing from the scope of the disclosure as defined by the appended claims. For example, aspects or components of one disclosed embodiment take the place of or may be combined with components of another disclosed embodiment. Likewise, actions of one disclosed method may take the place of or be combined with actions of another disclosed method.

FIG. 1 schematically illustrates an example network environment that is suitable for facilitating various systems and methods for tracking state in accordance with disclosed state tracking services. The network environment includes one or more computing devices, depicted as a computing device 110a, a computing device 110b and a computing device 110c (hereinafter collectively referred to as computing devices 110). The network environment also includes a server 140, a database 150 associated with the server 140 and a communication network 160.

The computing devices 110 are coupled in communication with the server 140 via the communication network 160. The communication network 160 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

Examples of the computing devices 110 include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs).

The network environment may be implemented in various ways, depending on various possible scenarios. In one example scenario, the network environment may be implemented by way of a spatially collocated arrangement of the server 140 and the database 150. In another example scenario, the network environment may be implemented by way of a spatially distributed arrangement of the server 140 and the database 150 coupled mutually in communication via the communication network 160. In yet another example scenario, the server 140 and the database 150 may be implemented via cloud computing services.

Optionally, the computing devices 110 may access the server 140 to download one or more software products associated with disclosed state tracking services. In one embodiment, disclosed systems are arranged in a manner such that their functionality is implemented partly in the computing devices 110 and partly in the server 140. In another embodiment, the systems are arranged in a manner such that functionality is implemented substantially in the computing devices 110 by way of downloaded software products. In such a situation, the computing devices 110 may be coupled to the server 140 periodically or randomly from time to time, for example, to receive updates from the server 140 and/or to upload status to the server 140. In yet another embodiment, the systems are arranged in a manner that their functionality is implemented substantially in the server 140.

Users associated with the computing devices 110 use the state tracking service. Accordingly, some of the computing devices 110 may be used, operated, or carried by consumers of a state tracking service. Optionally, some of the computing devices 110 may be used, operated, or carried by technicians for the service. The system encourages tracking relative state of a number of objects.

While toys are frequently mentioned throughout the disclosure as examples of such objects, it should be noted that the disclosed methods and systems are not limited to use with toys. The disclosed methods and systems for providing a state tracking service lend themselves to implementation in a wide variety of settings. For example, the proximity of hazardous material handlers to hazardous material containers, the proximity of medical personnel to surgical equipment, or the proximity of sports team members to one another or to sports equipment could be tracked in real time.

The server 140 may be configured to store state, proximity or affinity data in the database 150, for example, by upload from one or more computing devices 110 over network 160. Stored state information which is generally RSSI values or information derived from or associated with RSSI values including but not limited to: sequence numbers; proximity or affinity expressed numerically; the level of proximity or affinity quantized into states like near, close, or far; changes in the proximity or affinity which might be labelled motion, fast motion, retreating or advancing; groupings and sets such as those that might be labeled "nearest pair", or "nearest three", or "most distant from group"; vectors, arrays, charts or any other groupings or combinations of the above; and filtered or otherwise algorithmically obtained combinations of the above over time and space Furthermore, the state tracking service can be offered free of cost. Alternatively, the state tracking service can be a paid service that has a one-time purchase fee or a subscription-based or a transaction-based billing, such as pay-per-use and pay-per-feature.

FIG. 1 is merely an example, which should not unduly limit the scope of the claims herein. It is to be understood that the specific designation for the network environment is provided as an example and is not to be construed as limiting the network environment to specific numbers, types, or arrangements of computing devices, servers, databases and communication networks. A person skilled in the art will recognize many variations, alternatives, and modifications of embodiments of the present disclosure.

Figure 2A:
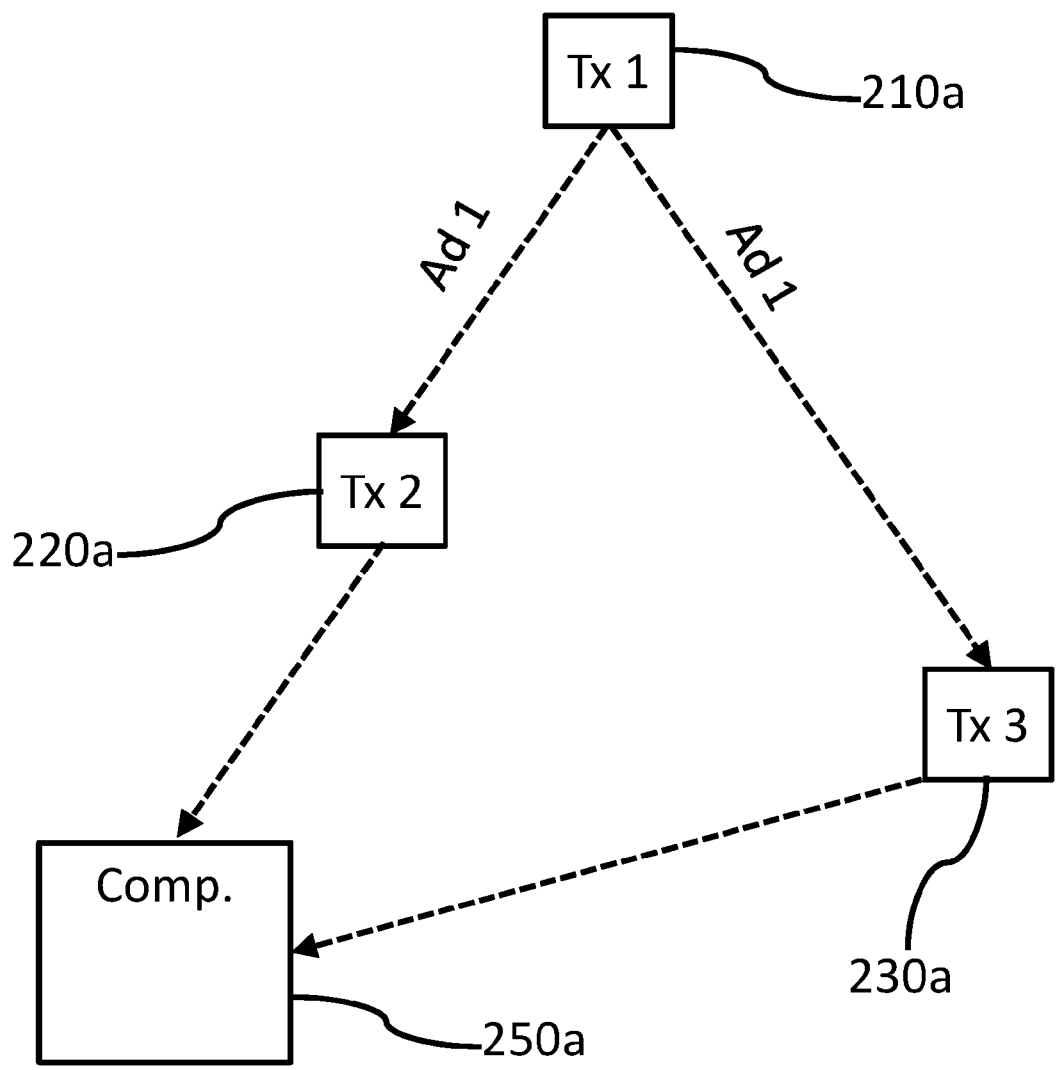
FIG. 2A schematically illustrates various components of an example state tracking system.

FIG. 2A schematically illustrates various components of an example state tracking system. Each of transceivers 210a, 220a and 230a, depending on their changing modes, are configured to broadcast and/or transmit as well as observe and/or receive advertising packets including programmable/customizable data payloads. In an example system for state tracking, a first transceiver or broadcasting transceiver 210a is configured to broadcast a first advertising packet. A plurality of other transceivers 220a and 230a are each configured to receive the first advertising packet as observing transceivers or when in observing mode and to broadcast subsequent advertising packets as broadcasting transceivers or when in broadcasting mode. The first transceiver 210a is further configured to receive one or more of the subsequent advertising packets as an observing transceiver. Furthermore, the first transceiver 210a is configured to broadcast first and second advertising packets and the plurality of second transceivers are configured to receive the first and second advertising packets.

A computing device 250a, to be described in greater detail below, is configured to receive advertising packets from transceivers 210a, 220a and 230a and analyze data included in the advertising packets, for example, RSSI values received in one or more previously broadcast advertising packets.

State evaluation may be performed by any of a number of alternative means including ultrasound, however, in view of cost and directionality issues, RSSI from a Bluetooth® Low Energy radio works well. Transceivers 210a, 220a and 230a may be low cost Bluetooth® Low Energy radios including an integrated processor and memory for running firmware that generates custom advertising packets. Examples include the CSR1010 or nRF51 series ICs.

Transceivers are configured for broadcasting and receiving wirelessly without establishing a paired connection therebetween. Each transceiver periodically broadcasts, into the local RF airspace, a vector of RSSI values within an advertising packet. Since connections do not have to be continually made and broken, dynamic use of a typically static, custom advertising header allows a much higher bandwidth. Also, all observing transceivers can pick up the same advertising packet from a broadcasting transmitter and glean an RSSI value.

Thus, where a traditional connection-based scheme would require one less transmission than the number of active transceivers to establish given information, the disclosed approach requires only a single transmission to establish the same information. For example, if there were six active transmitters, the disclosed connectionless approach would require less than one fifth the bandwidth of the traditional connection-based scheme. Because a transceiver may be in an observing mode for 250 ms and then transition to a broadcasting mode for 5 ms before transitioning back to observing for another 250 ms, loss of some packets to some listeners and collisions between packets will be negligible. During the 5 ms of broadcasting time there may be several reattempts at broadcasting a given advertising packet. Also, since transceivers may be configured to take on a "sleep mode" in which they are turned off and not broadcasting or observing for between about 40 to about 150 ms, battery life is conserved.

Advertising packets broadcast by transceivers 210a, 220a, 230a and computing device 250a are sent multiple times. Each repeated advertisement is an opportunity for all listening/observing/scanning transceivers to update internal RSSI vectors. This includes RSSI vectors in the computing device 250a. Each row in a state matrix (described below) is the vector of "last seen RSSI" values as observed by each of the several observing transceivers in the system.

If a transceiver detects multiple RSSI values for a given other transceiver, filtering or averaging these values may yield a more accurate state reading.

Figure 2B:
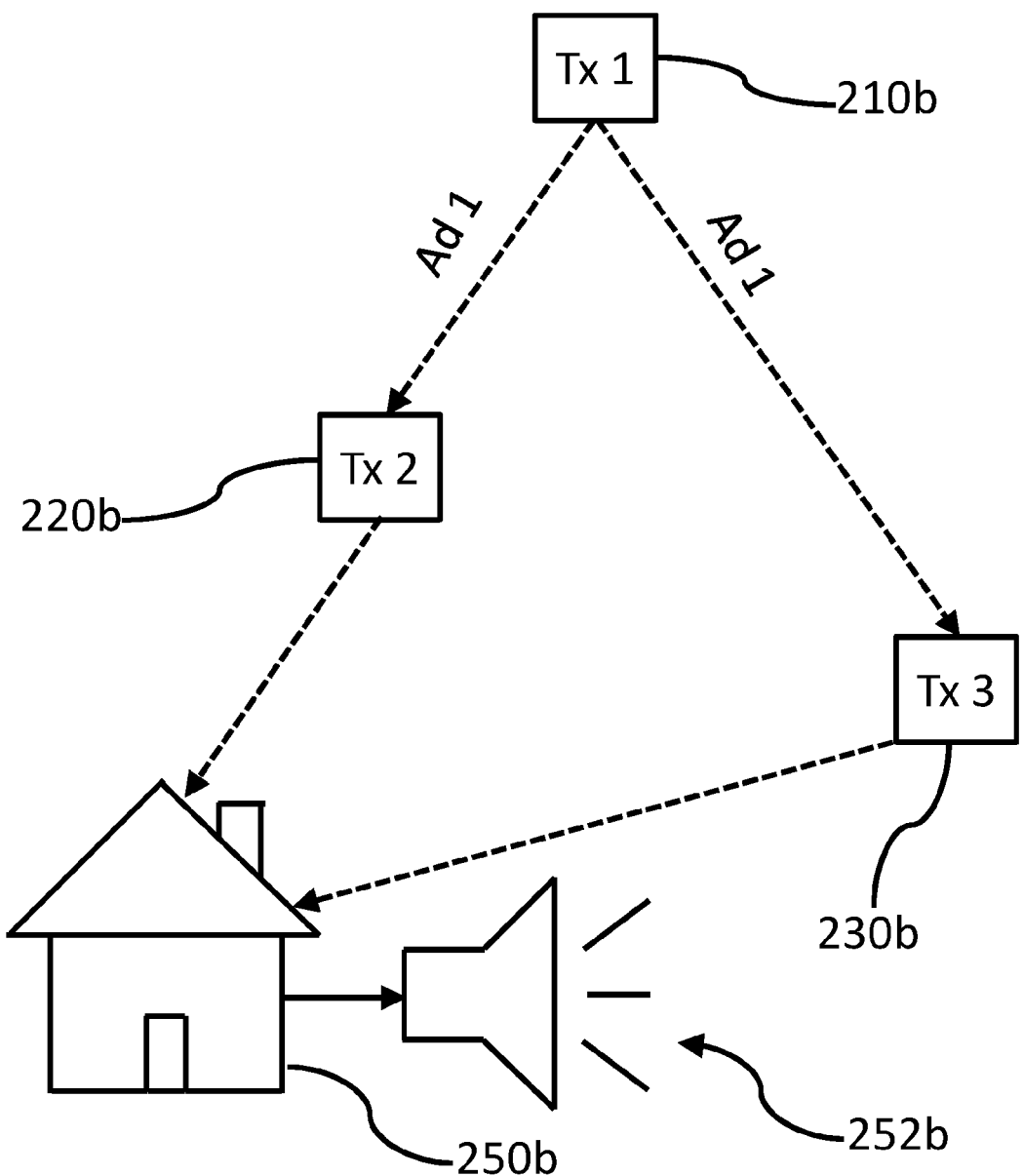
FIG. 2B schematically illustrates various components of an example state tracking system usable for the amusement of one or more users.

Disclosed transceivers may be coupled or otherwise associated with objects for which proximity tracking and/or affinity tracking is desired. FIG. 2B schematically illustrates various components of another example state tracking system. Similar to the example of FIG. 2A, transceivers 210b, 220b and 230b are configured to broadcast and/or transmit as well as observe and/or receive advertising packets including programmable/customizable data payloads. Unlike the example of FIG. 2A, a computing device 250b configured to receive advertising packets from each of transceivers 210b, 220b and 230b is disguised as or is a component of an object such as a toy. The toy may include but is not limited to a typically stationary object such as a doll house, school, police station, or castle. In an example, the computing device could be a small tablet or other mobile device configured to be placed under a toy such as the aforementioned doll house. As with computing device 250a, computing device 250b is configured to analyze data included in the advertising packets, for example, RSSI values received in one or more previously broadcast advertising packets. Stationary toys may have a character and a number of characteristics associated with them or may be included in a real time state matrix just to help a dialog engine sequence dialog models which involve locations.

Furthermore, in response to analysis of the advertising packets in whole or in part, computing device 250b may be configured to provide output through an audio speaker 252b. Audio is only an example of output which may be provided by computing device 250b and output is not limited to audio output. In another example, computing device 250b may provide visual output. It should be noted that while output including speaker 252b has been associated with computing device 250b, an output may alternatively be operatively coupled with transceivers 210b, 220b and/or 230b more directly.

While only four transceivers (including computing device) are illustrated, it is to be noted that the data capacity of a custom advertising packet payload along with more packed encoding enables simultaneous tracking of many more transceivers.

Figure 3:
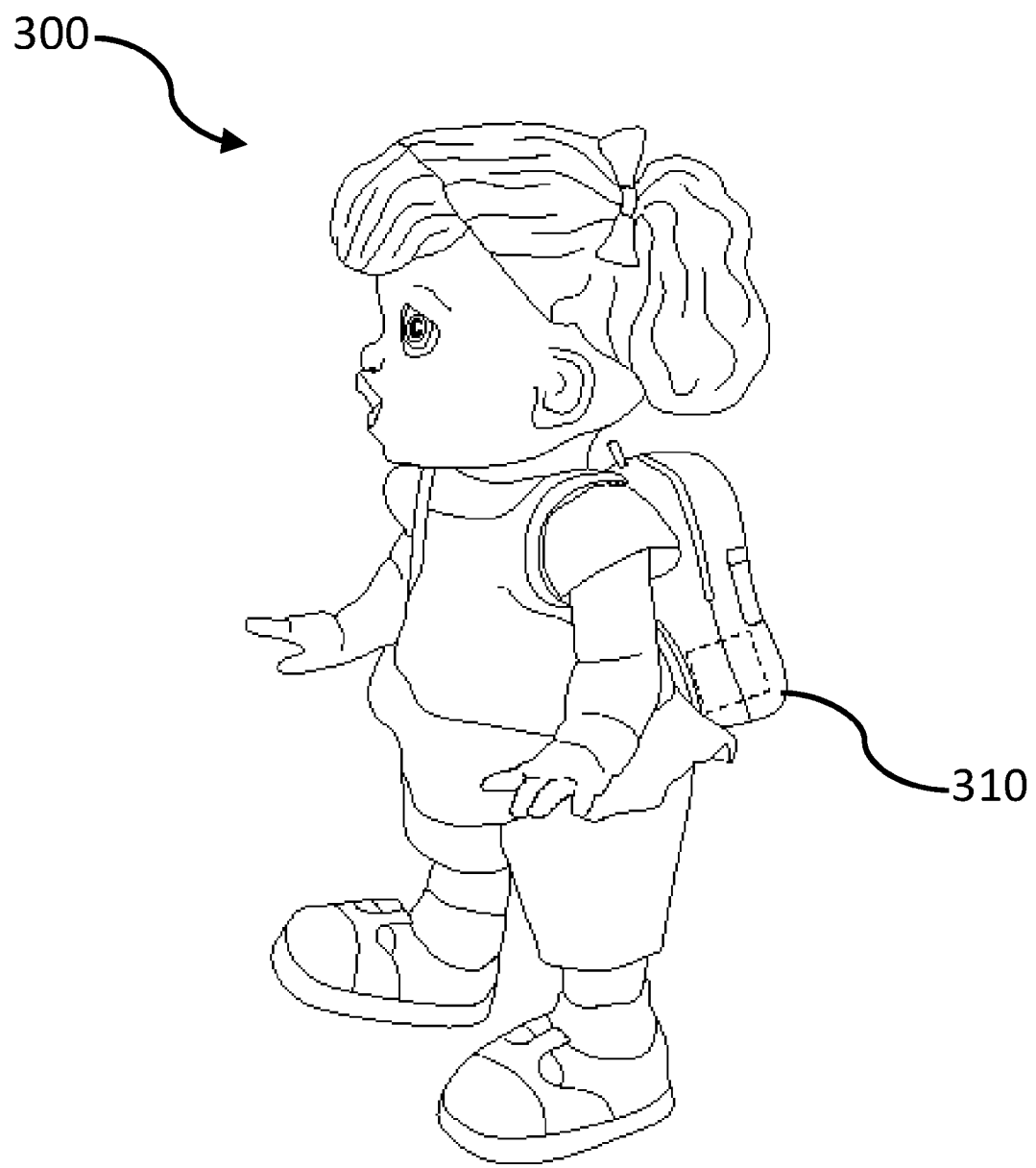
FIG. 3 illustrates an example incorporation of a transceiver into a component of a toy.

Toys with which transceivers are associated are not limited to stationary objects and may include but are not limited to dolls, action figures, figurines, plush toys, trucks, boats, cars, or trains. FIG. 3 illustrates an example incorporation of a transceiver into a component of a toy. A toy such as doll 300 is suitable for use with embodiments of the disclosure including but not limited to examples described with reference to FIGS. 2A, 2B or a combination of these. A transceiver carried within doll backpack 310 is configured to broadcast advertising packets to other transceivers which may or may not be carried in a similar toy component such as a wearable item of a doll including but not limited to vests or other clothing, purses or shields. For example, a doll 300 having a backpack 310 with a hidden or otherwise disguised transceiver may take the place of any of the transceivers 210a, 220a or 230a described with reference to FIG. 2A or 210b, 220b or 230b described with reference to FIG. 2B and may further take the place of any presently disclosed transceivers unless otherwise stated. In another example, the transceivers are integrated into the toy and made available as a single unit. In yet another example, the transceivers are available separately and the user attaches them to toys as they prefer. While FIG. 3 illustrates an example in which a wearable item including a transceiver is mounted to a back of a doll, some wearable items are more appropriately carried by or mounted to the front of a doll.

Furthermore, as mentioned above, transceivers may be associated with any of a variety of objects or subjects. Transceivers associated with individual persons could form part of a system for tracking proximity or affinity of one or more persons to one or more other persons, for example, to determine which attendees at a social engagement interact with whom or which athletes interact during a sporting event. Transceivers associated with individual surgical instruments may form part of a system for tracking proximity of surgical instruments so that it may be determined whether there has been a contaminating interaction.

Figure 4:
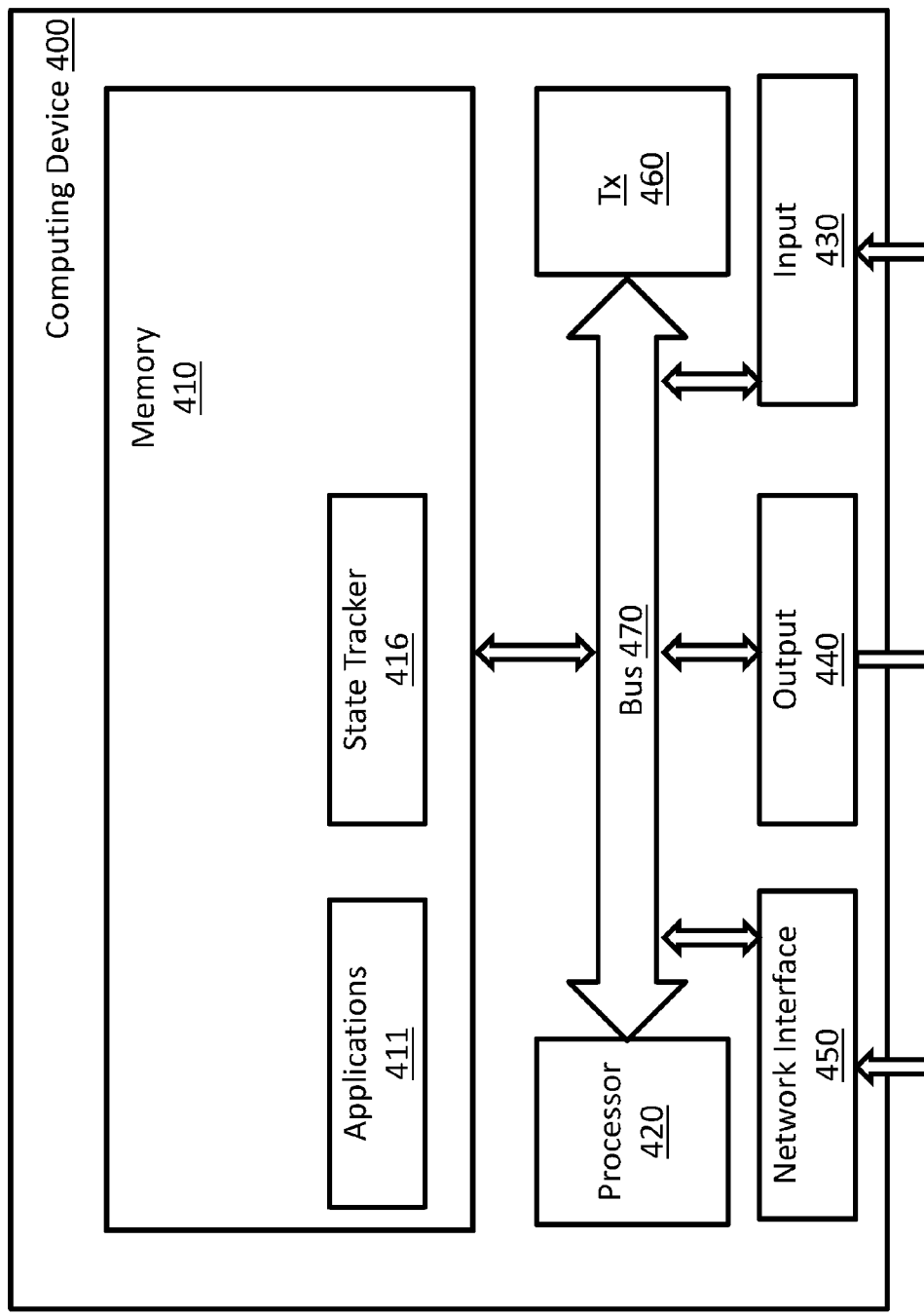
FIG. 4 schematically illustrates an example computing device useable as part of an example state tracking system.

FIG. 4 schematically illustrates an example computing device useable as part of an example state tracking system. The computing device 400 may be implemented as represented by computing devices 110, the computing device 250a or the computing device 250b and vice versa. The computing device 400 includes, but is not limited to, a memory 410, computing hardware such as a processor 420, input devices 430, output devices 440, a network interface 450, a configuration of transceivers 460 and a system bus 470 that operatively couples various components including the memory 410, the processor 420, input devices 430, output devices 440, the network interface 450, and transceivers 460. The output devices 440 may include but are not limited to a display screen for presenting graphical images to a user of the computing device 400 and a speaker for providing audio output to the user. In some examples, a display screen may additionally function as an input device 430 as with, for example, touch screens.

The computing device 400 also includes a power source (not shown) for supplying electrical power to the various components of the computing device 400. The power source may, for example, include a rechargeable battery.

The memory 410 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

In an example, memory 410 stores a number of applications as well as a state tracker 416. The state tracker 416, described in greater detail below, may, for example, be a software product associated with the state tracking service. Executing the state tracker 416 on the processor 420 may, in part, result in generating and rendering a graphical user interface on the display screen. The graphical user interface is configured to facilitate user interactions with the state tracking service.

As suggested above, in some examples, input 440 may include a touch-sensitive display screen that is operable to receive tactile inputs from the user. These tactile inputs may, for example, include clicking, tapping, pointing, moving, pressing and/or swiping with a finger or a touch-sensitive object like a pen.

Additionally or alternatively, the input devices 430 may include a mouse or a joystick that is operable to receive inputs corresponding to clicking, pointing, and/or moving a pointer object on the graphical user interface. The input devices 430 may alternatively or additionally include a keyboard that is operable to receive inputs corresponding to pushing certain buttons on the keyboard and/or a microphone for receiving an audio input from the user.

Moreover, the transceivers 460 may include but are not limited to electromagnetic transceivers and acoustic transceivers and combinations thereof. For example, transceivers 460 may take the form of radio transceivers, infrared transceivers, audible transceivers or ultrasonic transceivers. In some examples, the state tracker 416 may be interfaced with the transceivers 460. When executed on processor 420 the state tracker 416 is configured to resolve and integrate inputs from the transceivers 460 into useful information about a transceiver state.

In some examples, computing device 400 may further include one or more sensors (not shown) which include but are not limited to one or more of: an accelerometer, a magnetometer, a pressure sensor, a temperature sensor, a gyroscopic sensor, a Global Positioning System (GPS) sensor, or a timer. The sensors may be used to measure and collect data related to surroundings of the computing device 400. The sensors may include a timer for including time-stamps with any of various sensory inputs. Alternatively, processor 420 may provide system time as reference for including the time-stamps.

Moreover, the memory 410 is a non-transient data storage medium. The state tracker 416, when executed on the processor 420, is optionally coupled to the memory 410, and is configured to substantially continuously record and update RSSI values in the memory 410. Additionally, the state tracker 416, when executed on the processor 420, may store toy identifiers, character identifiers, transceiver identifiers, character scripts, characteristics or phrases or a combination of these in the memory 410.

For example, memory 410 is configured, in cooperation with processor 420 and state tracker 416, to record, for each of the plurality of other transceivers, an RSSI value of a first advertising packet received from a first transceiver in a broadcasting mode and to record, for the first transceiver in an observing mode, an RSSI value of a subsequent advertising packet broadcast by one or more of the plurality of other transceivers in a broadcasting mode. The memory 410 is further configured to record, for each of the plurality of other transceivers in observing mode, an RSSI value of a second advertising packet broadcast by the first transceiver in broadcasting mode.

Furthermore, the network interface 450 optionally allows the computing device 400 to upload RSSI values, state vectors or a combination of these to the server 140, for example, via the communication network 160. Additionally, the network interface 450 may allow the computing device 400 to access the server 140 to update the state tracker and/or download one or more new software products associated with a state tracking service.

Moreover, the network interface 450 optionally allows the computing device 400 to communicate with other computing devices, for example, via a communication network. In some examples, transceiver 460 may be integrated with network interface 450 or vice versa.

The computing device 400 is optionally implemented by way of at least one of: a mobile phone, a smart telephone, an MID, a tablet computer, a UMPC, a phablet computer, a PDA, a web pad, a PC, a handheld PC, a laptop computer, a desktop computer, an NAS device, a large-sized touch screen with an embedded PC, and an interactive entertainment device, such as a game console, a TV set and an set top box (STB).

FIG. 4 is merely an example, which should not unduly limit the scope of the claims herein. It is to be understood that the specific designation for the computing device 400 is provided as an example and is not to be construed as limiting the computing device 400 to specific numbers, types, or arrangements of modules and/or components of the computing device 400. A person skilled in the art will recognize many variations, alternatives, and modifications of embodiments of the present disclosure.

Figure 5:
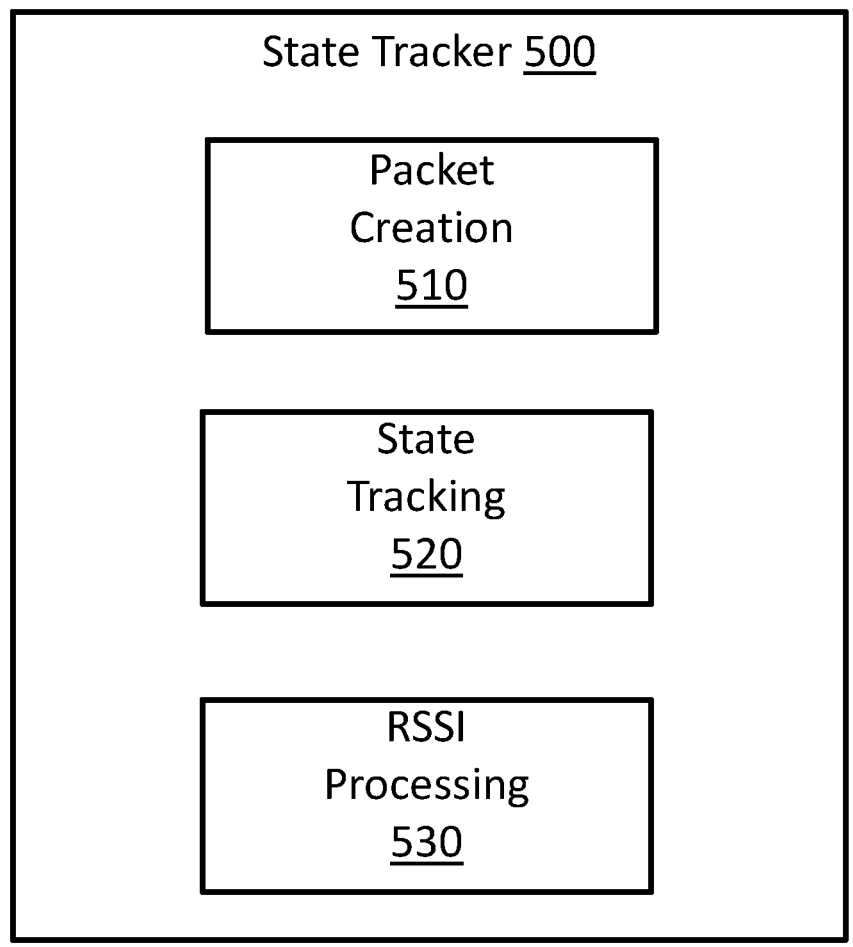
FIG. 5 schematically illustrates an example state tracker tool configured for installation on a computer useable as part of an example state tracking system.

FIG. 5 schematically illustrates an example state tracker tool configured for installation on a computer useable as part of an example state tracking system. State tracker 500, which may be installed on computer 400 as state tracker 416, includes but is not limited to a packet creation module 510, a state tracking module 520 and a module 530 for processing RSSI values of advertising packets from a number of observing or receiving transceivers.

When executed on processor 420, state tracker 500 may be configured to form advertising packets so as to comprise the RSSI value recorded by at least one or more transceivers in accordance with packet creation module 510. Advertising packets include a data stream in the form of a vector that is updated in real time to show the state of each of a number of transceivers to every other transceiver.

When executed on processor 420, state tracker 500 may further be configured to associate a state between a first transceiver and a second transceiver. For example, the two transceivers between which the highest combined RSSI values have been recorded may be associated as "most proximal" or "highest affinity" by state tracker 500. When a state or state change is associated with one or more of the transceivers or one or more toys or characters associated with the one or more transceivers, the state or state change may include or otherwise trigger one or more sounds to be produced with an audio speaker such as that described with reference to FIG. 2B or may trigger a different output.

Further, when executed on the processor 420, state tracker 500, may be configured to compare the RSSI value recorded for a first advertising packet to the RSSI value recorded for a second advertising packet. When the recorded RSSI values are different, in accordance with RSSI value processing module 530, state tracker 500 is configured to filter RSSI values for example by combining the RSSI value recorded for the first advertising packet with the RSSI value recorded for the second advertising packet to form a modified RSSI value.

When executed by the processor 420 state tracker 500 may be further configured to, in accordance with an RSSI value processing module 530, compare the RSSI value recorded for the second advertising packet with the RSSI value recorded for the first advertising packet. When, for one of a plurality of second transceivers, the RSSI value recorded for the second advertising packet is different from the RSSI value recorded for the first advertising packet, state tracker 500, in accordance with state tracking module 520, is configured to associate a state change with the second transceiver for which the different RSSI value was recorded.

When executed by the processor 420, in accordance with the RSSI processing module 530, state tracker 500 may be further configured to determine an affinity of one or more of a plurality of transceivers relative to one or more of the other transceivers based upon recorded RSSI values. In systems incorporating directional antennas, affinity describes the combined effects of proximity and relative orientation. Note that in cases where no directional antennas are being used, affinity may reduce to proximity.

It should be noted that state tracker 500 may be arranged differently so as to include modules not disclosed here, so that two or more of packet creation module 510, state tracking module 520 and RSSI processing module 530 are combined or so that tasks of one or more of the packet creation module 510, state tracking module 520 and RSSI processing module 530 are the responsibility of one or more of the other of packet creation module 510, state tracking module 520 and RSSI processing module 530 or the responsibility of one or more additional modules. Alternatively or additionally, packet creation module 510 may be installed on a memory (not shown) included with or coupled with one or more transceivers employed for disclosed state tracking systems, methods and services and may be executed by a processor included with or coupled with the one or more transceivers. Examples of such processors are described above with reference to FIGS. 2A and 2B.

Figure 6:
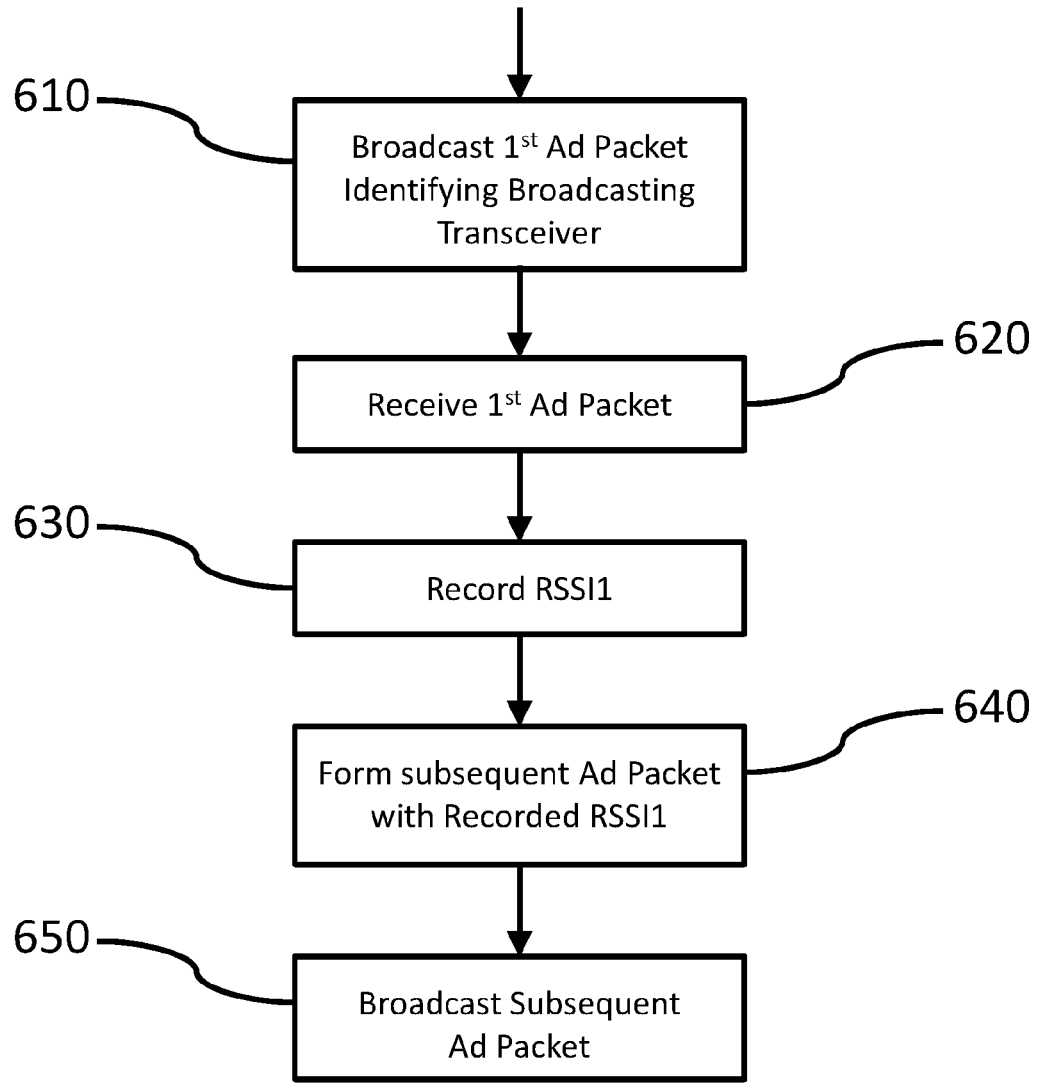
FIG. 6 illustrates a flow diagram of an example method for state tracking in accordance with disclosed embodiments.

FIG. 6 illustrates a flow diagram of an example method for state tracking in accordance with disclosed embodiments. The method is depicted as a collection of actions in a logical flow diagram, which collection may be implemented in hardware, software, or a combination thereof. The example method includes broadcasting a first advertising packet from a first transceiver at 610; receiving, by a plurality of second transceivers, the first advertising packet at 620; and for each of the plurality of second transceivers, recording an RSSI value of the first advertising packet received at 630. A subsequent advertising packet comprising the RSSI value recorded by at least one of the plurality of second transceivers is formed at 640 and the subsequent advertising packet is broadcast from at least one of the plurality of second transceivers at 650. It should be noted that a subsequent advertising packet may be one which immediately follows the first advertising packet or may be separated from the first advertising packet by more than one broadcast/receive cycle.

Since any given transceiver may be operating in either broadcasting mode or observing mode at a given moment, the one or more of the second transceivers may assume the role of the first transceiver so as to broadcast subsequent advertising packets at 650. The method depicted in FIG. 6 can continue cyclically for an indefinite number of rounds such that, for example, the advertising packet broadcast at 650 is received or observed by some number of transceivers and the RSSI of this advertising packet is recorded and one or more additional advertising packages are formed.

Figure 7:
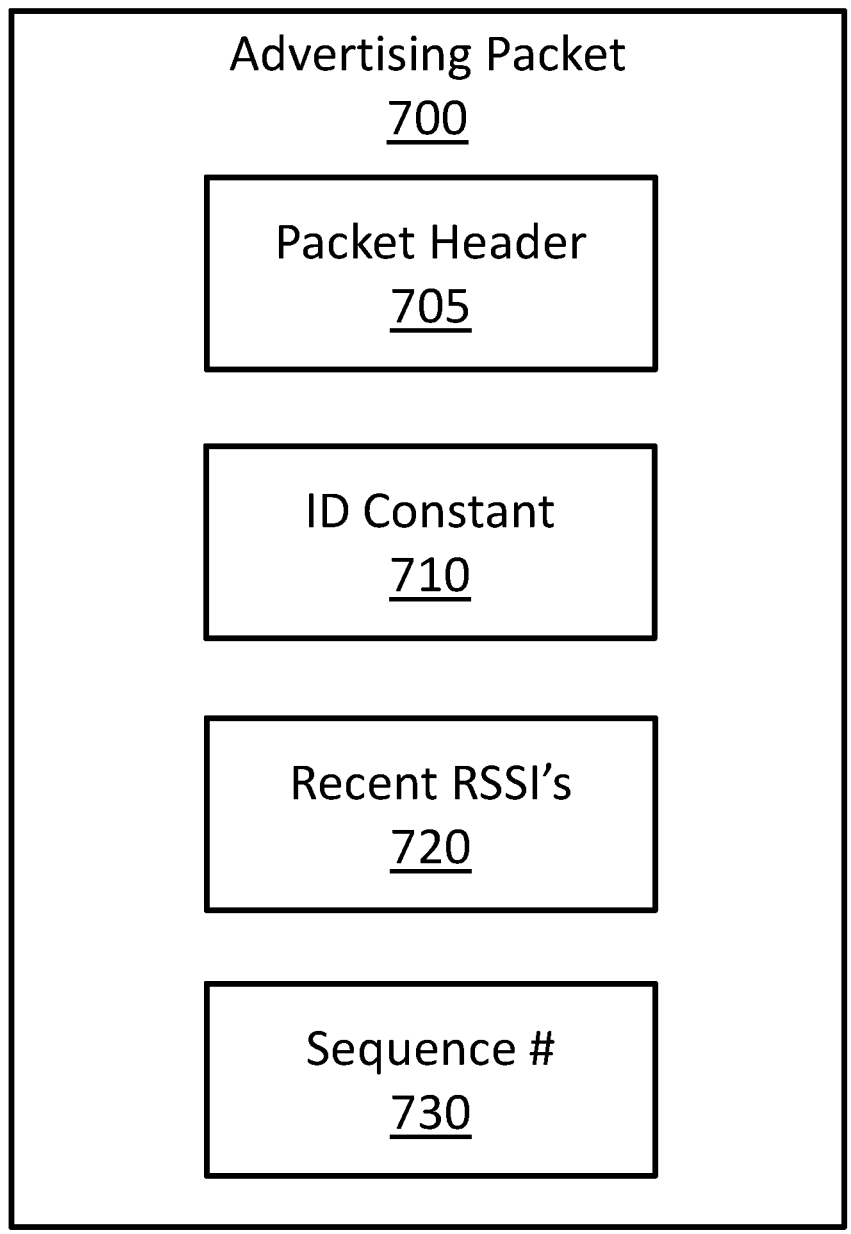
FIG. 7 schematically illustrates an example advertising packet which may be created by a processor, broadcast by one or more transceivers and/or received by one or more other transceivers.

FIG. 7 schematically illustrates an example advertising packet which may be created by a processor, broadcast by one or more transceivers and received by one or more other transceivers in accordance with disclosed example methods including the example method described with reference to FIG. 6. Advertising packet 700 includes a customizable data payload in the form of a vector of recent RSSI values 720 recorded for various observing or receiving transceivers and including an identification 710, described in greater detail below, of the transceivers from which the RSSI values were received. Advertising packet 700 may additionally include a header 705 which may be protocol specific and further include but is not limited to a unique identifier and message length. Advertising packet 700 may also include a sequence number 730 designating which iteration of the RSSI vector is being received. A sequence number may facilitate differentiation between repeated advertisements from subsequent cycles of filtered RSSIs that are the same as those seen in the last round. For example, it is possible to determine that a given transceiver has checked in with new data and that the new data in the vector has not changed since the last round. It should be noted that disclosed advertising packets are not limited to the payload illustrated in FIG. 7.

Each advertising packet is configured to identify, within the broadcast advertising packet, the transceiver broadcasting the given RSSI vector. In an example which maintains uniformity and simplicity, the custom payload of the transmitted advertising packet is identified with a 0xFF. Because an RSSI of 0xFF is not used, this special character can be used to identify the transceiver sending the advertisement.

TABLE 1A

Example of real time RSSI vector advertising packet

| Header | Tx 1 | Tx 2 | Tx 3 | Computing device | Seq# | CRC |
|---|---|---|---|---|---|---|
| BLE and Custom header | 0xC5 | 0xD8 | 0xFF | 0xB5 | 0x25 | 0x3C21A5 |

In table 1 above, it is apparent that Tx 3 broadcast this vector of RSSI values because the slot for Tx 3 has the special byte 0xFF. In this scheme certain bytes in a fixed length advertisement always correspond to certain transceiver numbers. The computing device identifies all of the transceivers within range and assigns them a transceiver number so that the slot for including the special byte in the outgoing payload is established for each transceiver. The advertising packet represented in Table 1 is merely an example of a scheme to identify broadcasting transceivers and other schemes for indicating which RSSI values belong to which observed transceivers are possible.

It should be noted that the example advertising packet represented in Table 1 does not detail many layers of header including preamble access address and packet length. In a further example, custom header information may contain the number of participating characters or transceivers or a start byte to reflect that the advertising packet is part of the real-time RSSI vector system.

In another example scheme for identifying which transceiver has sent a particular RSSI vector the need for ID constant 710 is eliminated. Instead, the unique sender identification found in the header of the advertisement packet is used. With the sender known, entries of the RSSI vector are one less than the total number of transceivers under consideration as the sender does not send an RSSI value for the sender's own packet as it does not receive its own advertising packet on transmission.

TABLE 1B

Example of real time RSSI vector advertising packet

| Header | Sender | Tx 1 | Tx 2 | Computing device | Seq# | CRC |
|---|---|---|---|---|---|---|
| BLE and Custom header | 0x03 | 0xC5 | 0xD8 | 0xB5 | 0x25 | 0x3C21A5 |

In table 1B, the first payload byte identifies the sender and the subsequent bytes represent the RSSI values the sender has observed for the other transceivers in the group.

Alternatively or additionally, an identification number could be pulled from information in the packet header. This technique may free space in the custom advertising payload so as to support additional transceivers at the cost of accessing and decoding the packet header.

Figure 8:
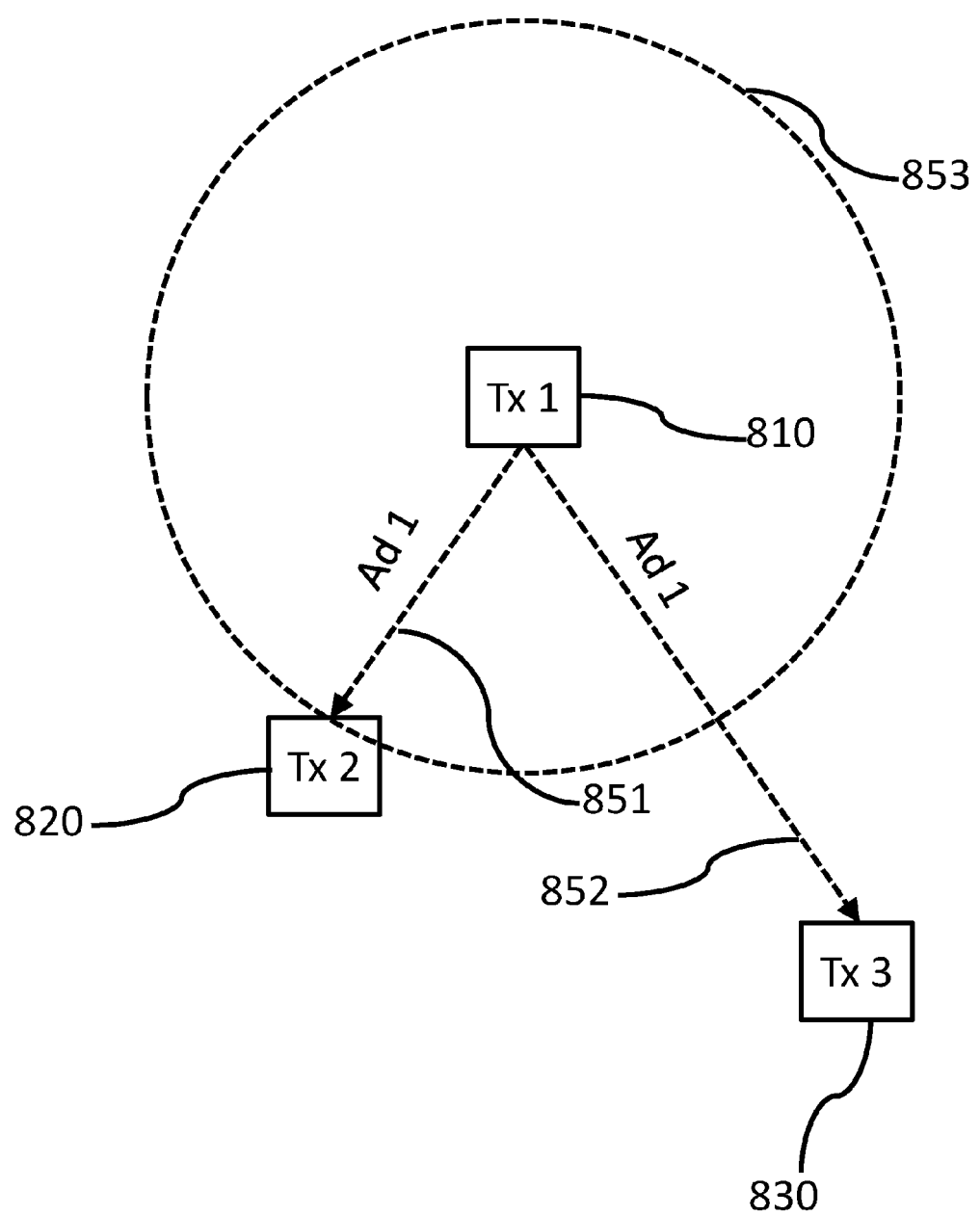
FIG. 8 schematically illustrates an example broadcast of an advertising packet from a first transceiver to a number of other transceivers.

FIG. 8 schematically illustrates an example broadcast of, from a first transceiver to a number of other transceivers, an advertising packet including programmable/customizable data payloads. Transceiver 810 broadcasts a first advertising packet to each of several transceivers 820 and 830. Since transceiver 820 is closer to broadcasting transceiver 810 than transceiver 830 is, it is expected that an RSSI value 851 is higher when the first advertising packet is received at transceiver 820 than an RSSI value 852 when the same advertising packet is received at transceiver 830. An action may be taken with respect to the transceiver 820 or some object or component operatively coupled therewith in view of its closer proximity to transceiver 810. For example, state may be recorded or otherwise established for transceiver 820 or between transceivers 810 and 820 but not for transceiver 830 or between transceivers 810 and 830. In a further example, a status may be recorded for an entire system such as a video game or a virtual game environment.

In some examples, a threshold proximity 853 may also be established such that transceivers recording RSSI values below a pre-established score are not considered within range to experience a change of state. For example, transceiver 830 is outside of a perimeter around transceiver 810 and records an RSSI value for an advertising packet that, when analyzed for proximity, does not meet the threshold 853.

Figure 9:
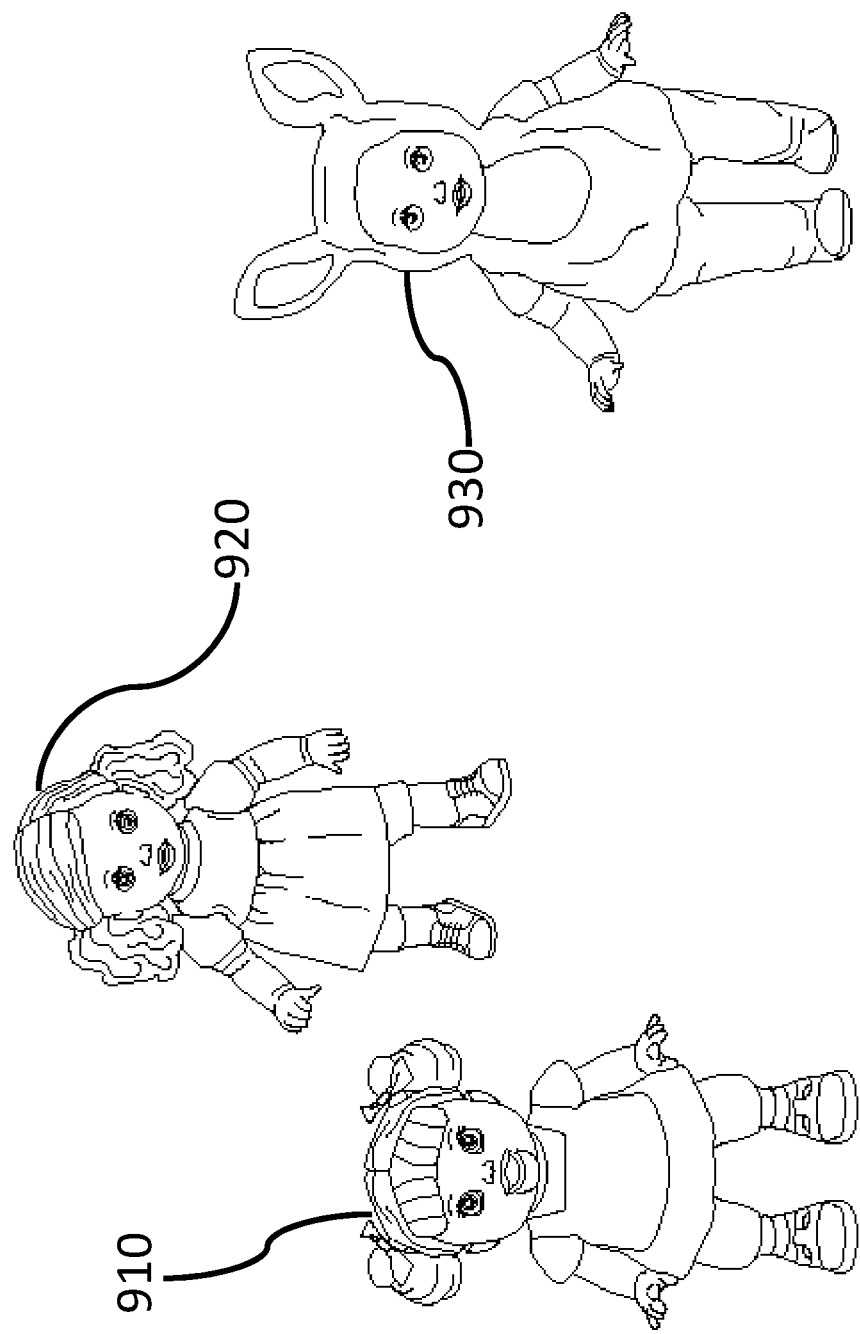
FIG. 9 illustrates example first and second toys closer to one another than an example third toy is to either.

FIG. 9 illustrates a further example of the scenario described with reference to FIG. 8. Toys 910, 920 and 930 are each provided with transceivers. The transceivers may be hidden in or otherwise disguised as a component of toys 910, 920 or 930, for example as described with reference to FIG. 3, or may be embedded within the toys themselves. A first toy 910 and its corresponding transceiver and second toy 920 and its corresponding transceiver are shown closer to one another than a third toy 930 and its corresponding transceiver are to either first toy 910 and its corresponding transceiver or second toy 920 and its corresponding transceiver.

Figure 10:
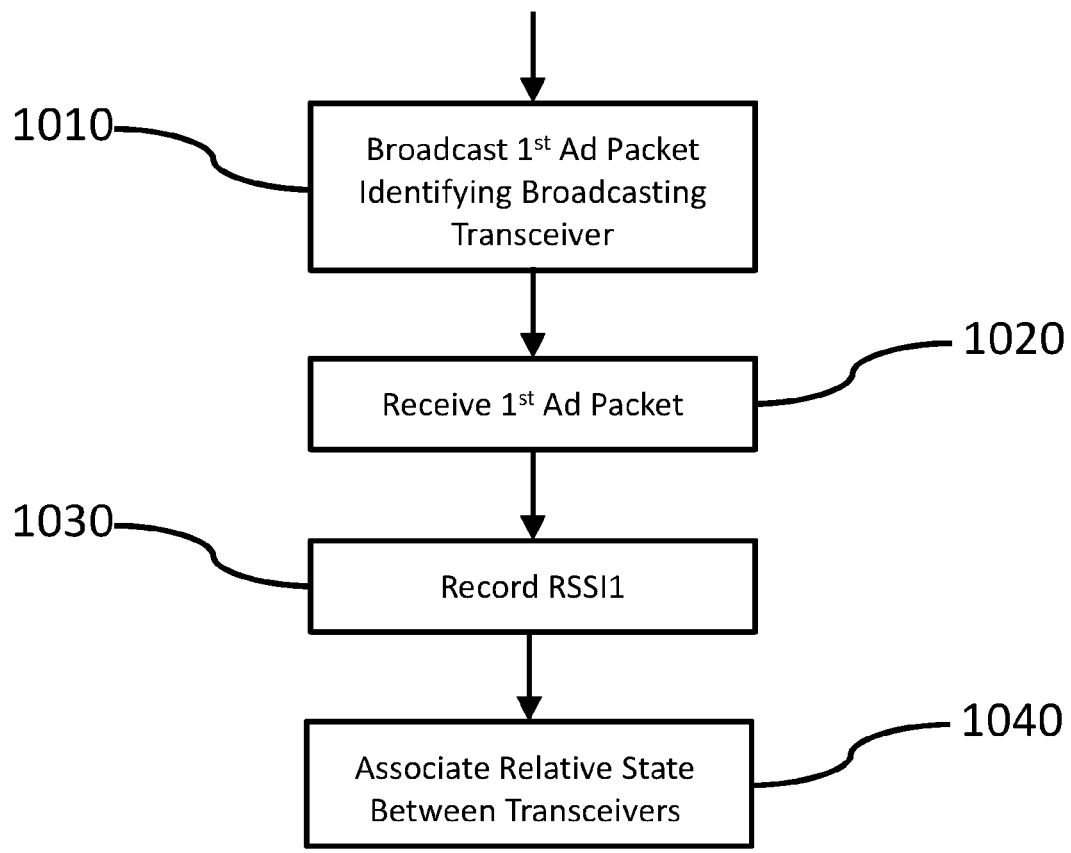
FIG. 10 illustrates a flow diagram of an example method for state tracking in accordance with disclosed embodiments.

FIG. 10 illustrates a flow diagram of an example method for state tracking in accordance with disclosed embodiments. The example method includes broadcasting a first advertising packet from a first transceiver at 1010; receiving at 1020, by a plurality of second transceivers, the first advertising packet; and, at 1030, recording an RSSI value of the first advertising packet received by each of the plurality of second transceivers. Then, according to action 1040, a state is associated between the first transceiver and the second transceiver for which the RSSI value is recorded. In an example, a state between transceivers such as a proximity or an affinity may be recorded or realized in state tracking module 520 (FIG. 5). In an example action in response to the established state, characters existing as part of a game can be made to output an element of a dialog such as through audio speaker 252b or may be caused to move from one location to another in a virtual reality when a given state is exhibited.

A very simple algorithm of associating states between transceivers with the greatest proximity or affinity based on overall RSSI is workable. However, several filtering strategies such as dynamic baseline adjustment, low pass filtering and others may be employed to optimize the real time state matrix. A derivative filter could be used in state tracking module 520 to detect a transceiver that has been thrown and move to a state appropriate to a character observing a colleague fly through the air.

A filter could also be devised to detect when the transceivers are no longer being moved or are no longer in motion. Since the RSSI values are noisy, something more sophisticated than simply looking for no changes may be employed. After some time, a speaker may output audio requesting engagement with the transceivers (or the objects associated therewith) or questioning what happened.

Figure 11A:
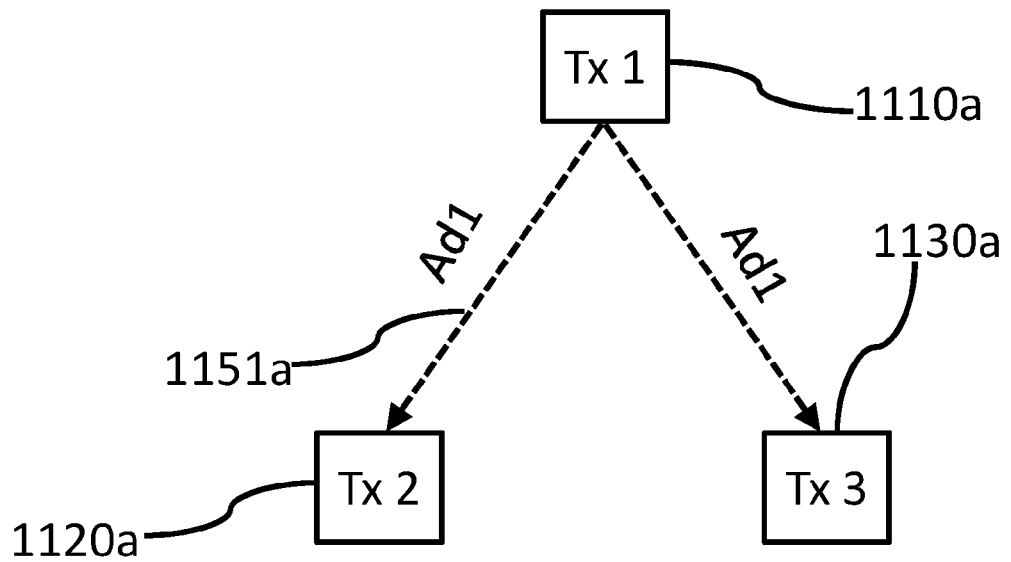
FIG. 11A schematically illustrates an example broadcast of a first advertising packet from a first transceiver to second and third transceivers while FIG. 11B schematically illustrates an example broadcast of a subsequent advertising packet from the second transceiver to the first and third transceivers.
Figure 11B:
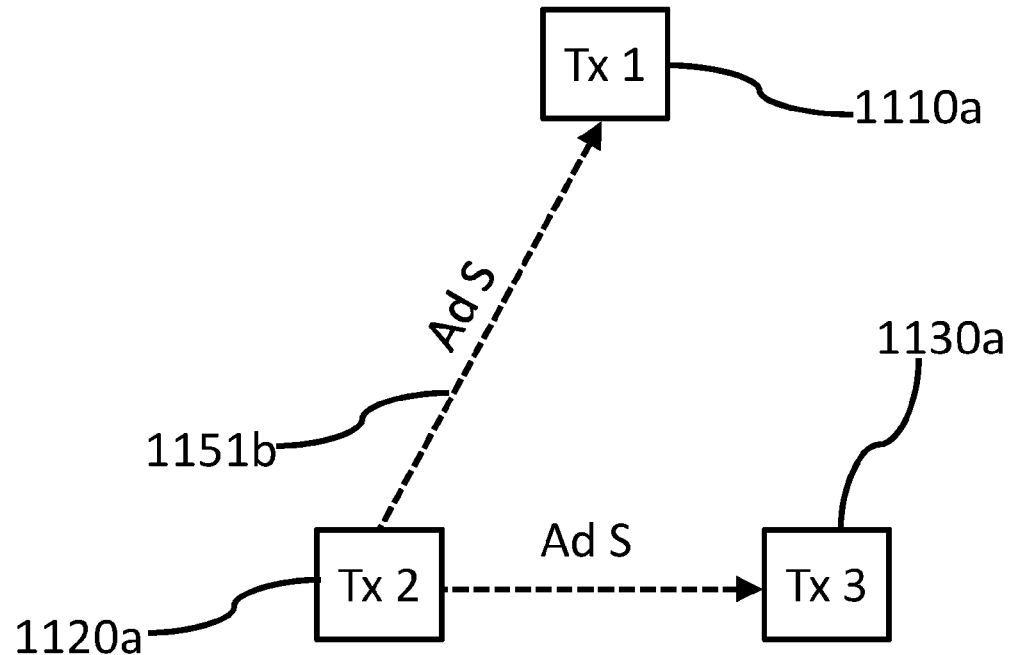

Because RSSI is a relatively noisy signal, using information from multiple readings is advantageous. FIG. 11A schematically illustrates an example broadcast of a first advertising packet from a first transceiver 1110a to second 1120a and third 1130a transceivers while FIG. 11B schematically illustrates an example broadcast of a second advertising packet from the second transceiver 1120a to the first 1110a and third 1130a transceivers.

As may be noted, the length of broken arrow 1151b representing the broadcast of a first advertising packet from transceiver 1110a to transceiver 1120a differs from the length of broken arrow 1151b representing the broadcast of a second advertising packet from transceiver 1120b to transceiver 1110b. In an example, the difference in length reflects a difference in RSSI values for the two broadcasts. While a longer arrow implies a longer transmission distance and a corresponding low RSSI value, in a physical example, the distance between the two transceivers may not have changed and, instead, something such as the noisiness of the transmitted signal, differences in calibration or reflection of transmission has prevented the same RSSI value from being recorded for both transceivers. The difference in RSSIs may be combined or otherwise filtered to yield a more accurate state.

Tables 2 and 3 demonstrate example consecutive frames of real time RSSI matrices. The vectors comprising the rows of the matrices may be included in disclosed advertising packets configured for transmission by transceivers, including those associated with toys 910, 920, 930 and computing device 400. Each row represents the most recent transmission seen from the transceiver associated with the transceiver cited in the first column. Since receipt of transmissions is not confirmed, some advertising packets may be lost. In an arrangement, a sequence number (column 6) associated with a given vector of RSSI values makes it possible to distinguish between a transmission of a "new" vector and retransmission of an "old" vector.

TABLE 2

Example of real time RSSI matrix at time t.

|  | Tx1 | Tx2 | Tx3 | Computing Device | Seq # |
|---|---|---|---|---|---|
| Tx1 | 0xFF | 0xD8 | 0xC1 | 0xB5 | 0x25 |
| Tx2 | 0xD0 | 0xFF | 0xC7 | 0xA3 | 0xFC |
| Tx3 | 0xC4 | 0xCA | 0xFF | 0xAD | 0xD9 |
| Computing Device | 0xB5 | 0xAF | 0xA9 | 0xFF | 0x6B |

TABLE 3

Example of real time RSSI matrix at time t + 1.

|  | Tx1 | Tx2 | Tx3 | Computing Device | Seq # |
|---|---|---|---|---|---|
| Tx1 | 0xFF | 0xD8 | 0xC1 | 0xB5 | 0x25 |
| Tx2 | 0xCC | 0xFF | 0xC7 | 0xA3 | 0xFD |
| Tx3 | 0xC4 | 0xCA | 0xFF | 0xAD | 0xD9 |
| Computing Device | 0xB5 | 0xAF | 0xA9 | 0xFF | 0x6B |

Although a full byte of resolution is shown, only a small band of possible RSSI values are exhibited in practice, especially for transceivers expected to be arranged in a table top, or bedroom floor sized area as in an example case of toys or within an area such as an operating room in an example case of surgical equipment. Fine resolution of state is not required in this application and relative rather than absolute state is sufficient. Smaller than full byte RSSI encoding could be used to enable incorporation of more transceivers within a system implementing a given advertising payload size.

Referring to Table 2 and its RSSI vector at time t as well as Table 3 and its RSSI vector at time t+1, transceiver Tx2 has updated the RSSI it observed for transceiver Tx1 to be smaller. This implies Tx1 and tx2 are losing affinity for one another, for example, by moving apart, turning away from one another or a combination of these.

If toys Tx1 and toy Tx2 are moving apart, the RSSI of toy Tx1's observation of toy Tx2 would be expected to decrease symmetrically in subsequent frames of the real-time state matrix. If the observation does not decrease, it may be an anomaly appropriate for filtering out.

The RSSI from the perspective of both transceivers of a pair is available for use in calculating proximities. Transceiver 1120a has an RSSI for a recent broadcast of transceiver 1110a stored, for example in row 2 column 1 of a proximity matrix while transceiver 1110a has an RSSI for a recent broadcast of transceiver 1120a stored, for example in row 1 column 2 of the proximity matrix.

In an example of filtering recorded RSSI values, RSSI values recorded by a first transceiver observing an advertising packet of a second transceiver are combined with RSSI values recorded by the second transceiver observing an advertising packet of the first transceiver. When considering the RSSI values recorded in the RSSI matrix of Table 2, 0xD0 is combined with 0xD8 and the result is stored at column 2 of row 1, 0xC4 is combined with 0xC1 and the result is stored at column 3 of row 1 and 0xCA is combined with 0xC7 and the result is stored at column 3 of row 2.

Figure 12:
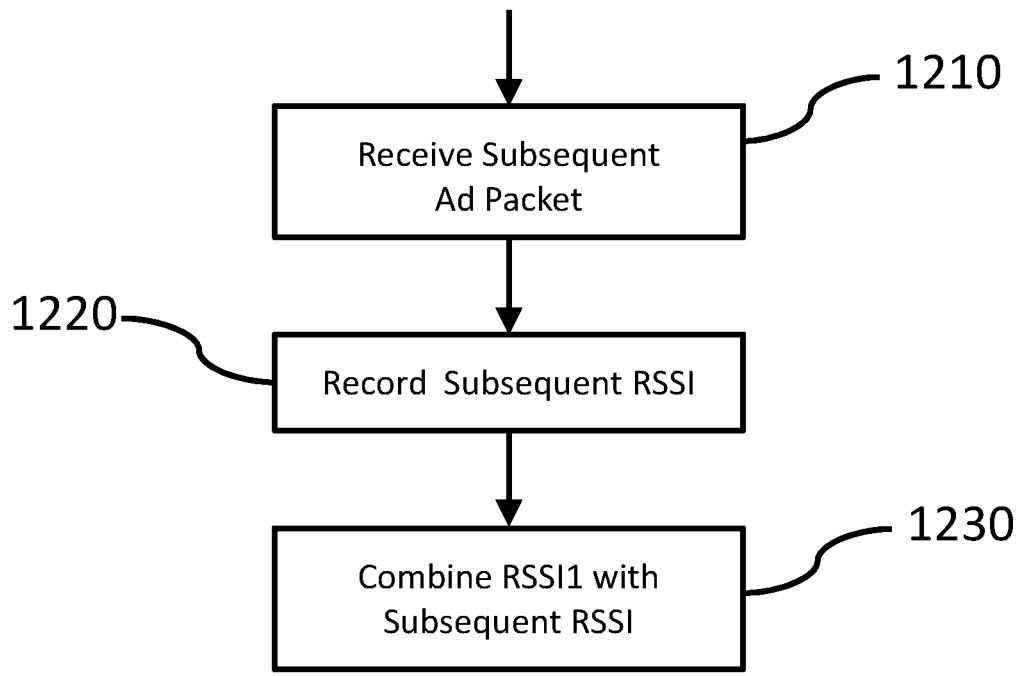
FIG. 12 illustrates a flow diagram of an example method for state tracking and an associated combination of RSSIs in accordance with disclosed embodiments.

FIG. 12 illustrates a flow diagram of an example method for state tracking in accordance with disclosed embodiments. The example method includes receiving, by the first transceiver, a subsequent advertising packet at 1210 as also described with reference to FIG. 6; recording an RSSI value of the subsequent advertising packet for the first transceiver at 1220 and combining the RSSI value recorded for the subsequent advertising packet with the RSSI value recorded for the first advertising packet to form a modified RSSI value in accordance with action 1230. The RSSI values could simply be averaged, or more advanced processing could be used to enhance resolution in time, resolution in space, or the number of transceivers that could be simultaneously used. For instance, a four bit sequence number (mentioned above) could be used for every observed RSSI value to allow better filtering over multiple observations of the same toy.

Figure 13:
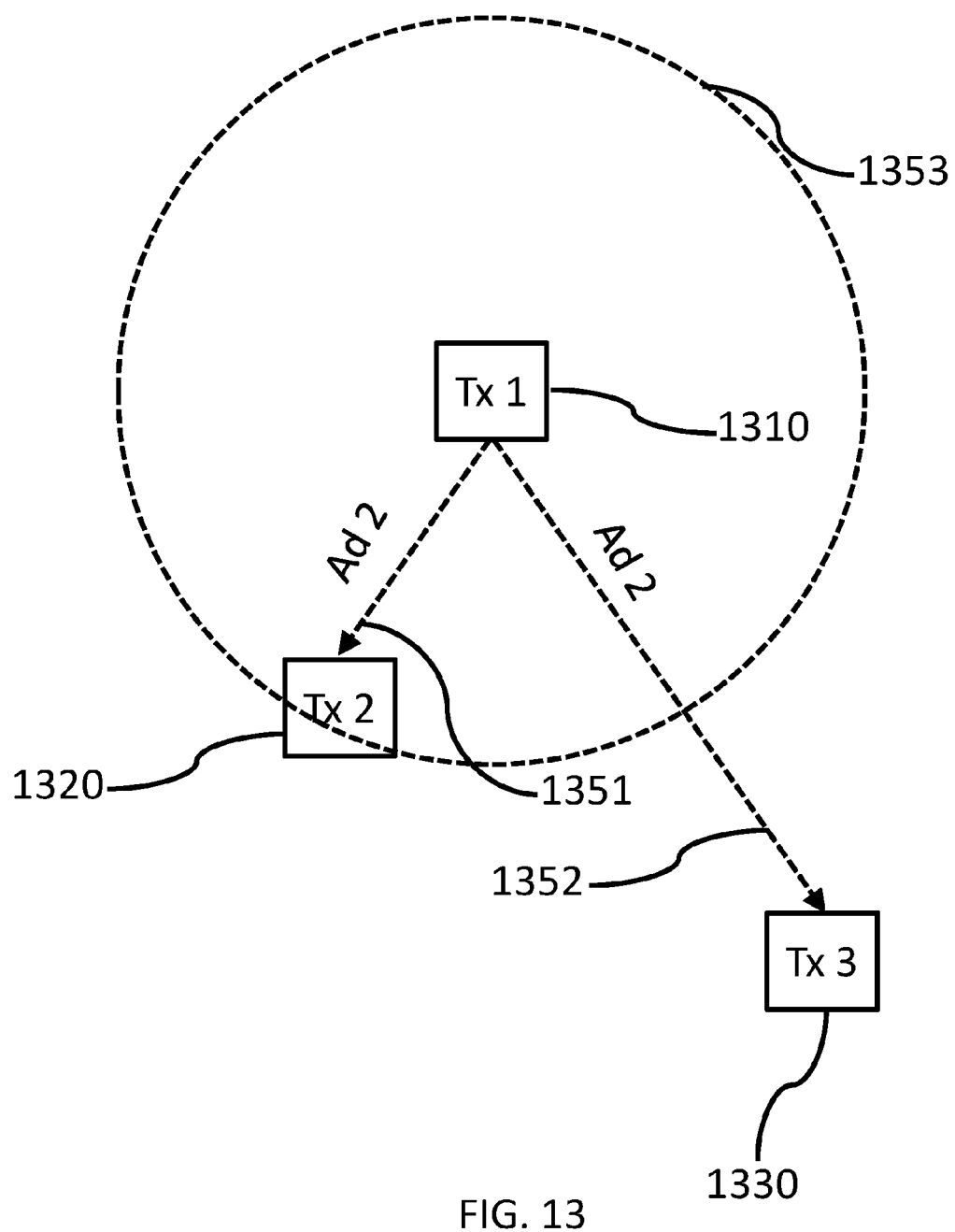
FIG. 13 schematically illustrates another example broadcast of an advertising packet from a first transceiver to a number of other transceivers.

FIG. 13 schematically illustrates another example broadcast of, from a first transceiver to a number of other transceivers, an advertising packet including a programmable/customizable data payload. Transceiver 1310 broadcasts a first advertising packet to each of several transceivers 1320 and 1330. Similarly to the scenario of FIG. 8, transceiver 1320 is closer to broadcasting transceiver 1310 than transceiver 1330 is. As such it is expected that an RSSI value 1351 is higher when the second advertising packet is received at transceiver 1320 than an RSSI value 1352 when the same advertising packet is received at transceiver 1330. However, in comparison to FIG. 8, transceiver 1320 has advanced toward transceiver 1310 and is reflected in a higher RSSI value recorded for transceiver 1320 than for transceiver 1320 for a previously broadcast advertising packet.

An action may be taken with respect to the transceiver 1320 or some object or component operatively coupled therewith in response to the changed RSSI. For example, a change of state may be recorded or otherwise established. As described with reference to FIG. 8, a threshold proximity 1353 may also be established such that transceivers recording RSSI values below a pre-established score are not considered within range to experience a change of state. Transceiver 1330, due to its location outside of the perimeter 1353 receives too low an RSSI value for a change of state to be recorded.

Figure 14:
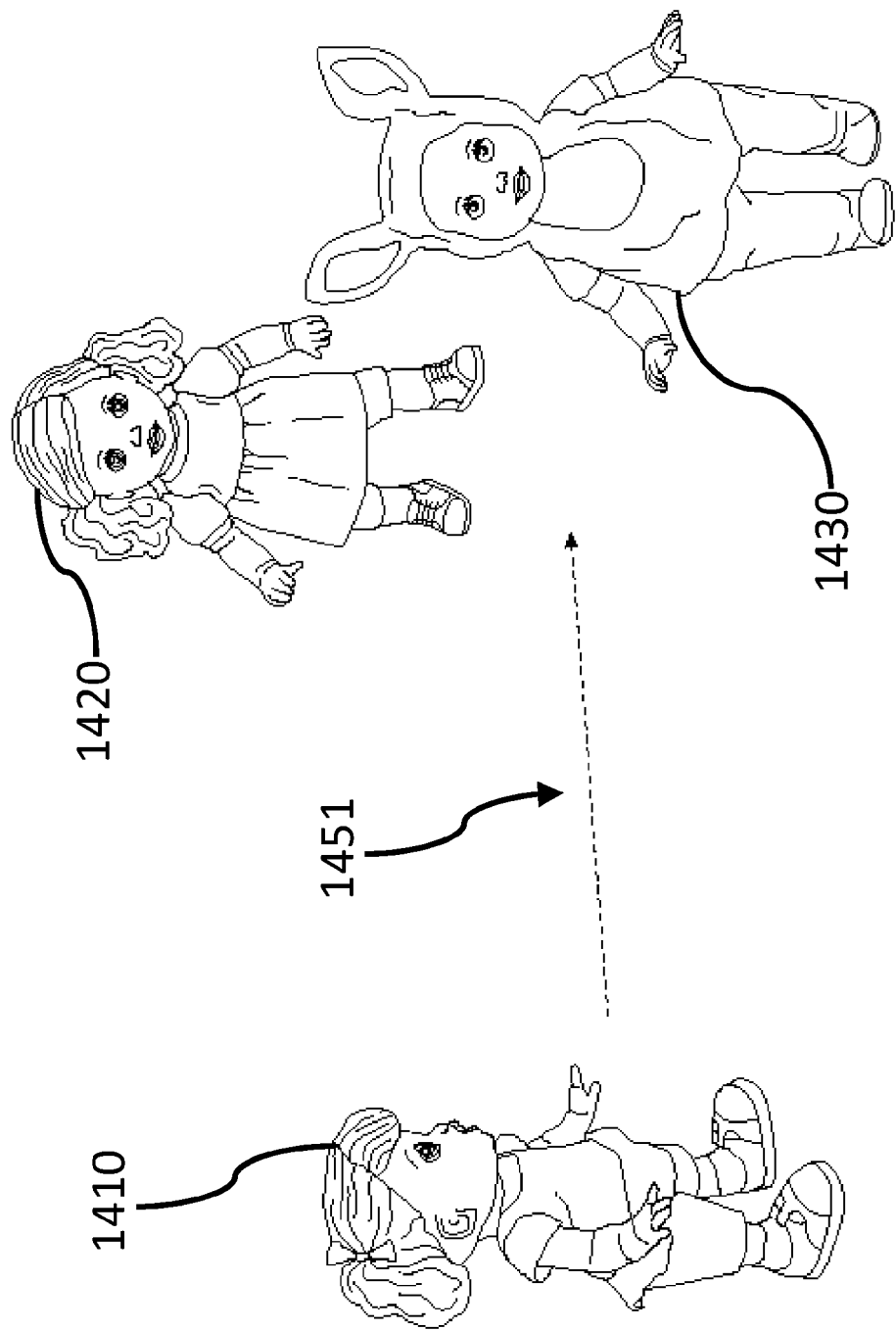
FIG. 14 illustrates an example advance of a first toy relative to second and third toys.

FIG. 14 illustrates a further example of the scenario described with reference to FIG. 13 in which a first transceiver advances towards one or more other transceivers. Toy 1410 and its corresponding transceiver advances, as indicated by arrow 1451, towards toys 1420 and 1430 and their corresponding transceivers. RSSI values recorded between toy 1410 and either or both of toys 1420 and 1430 increase as toy 1410 advances. As such, the state of toy 1410 may be established as "advancing."

Figure 15:
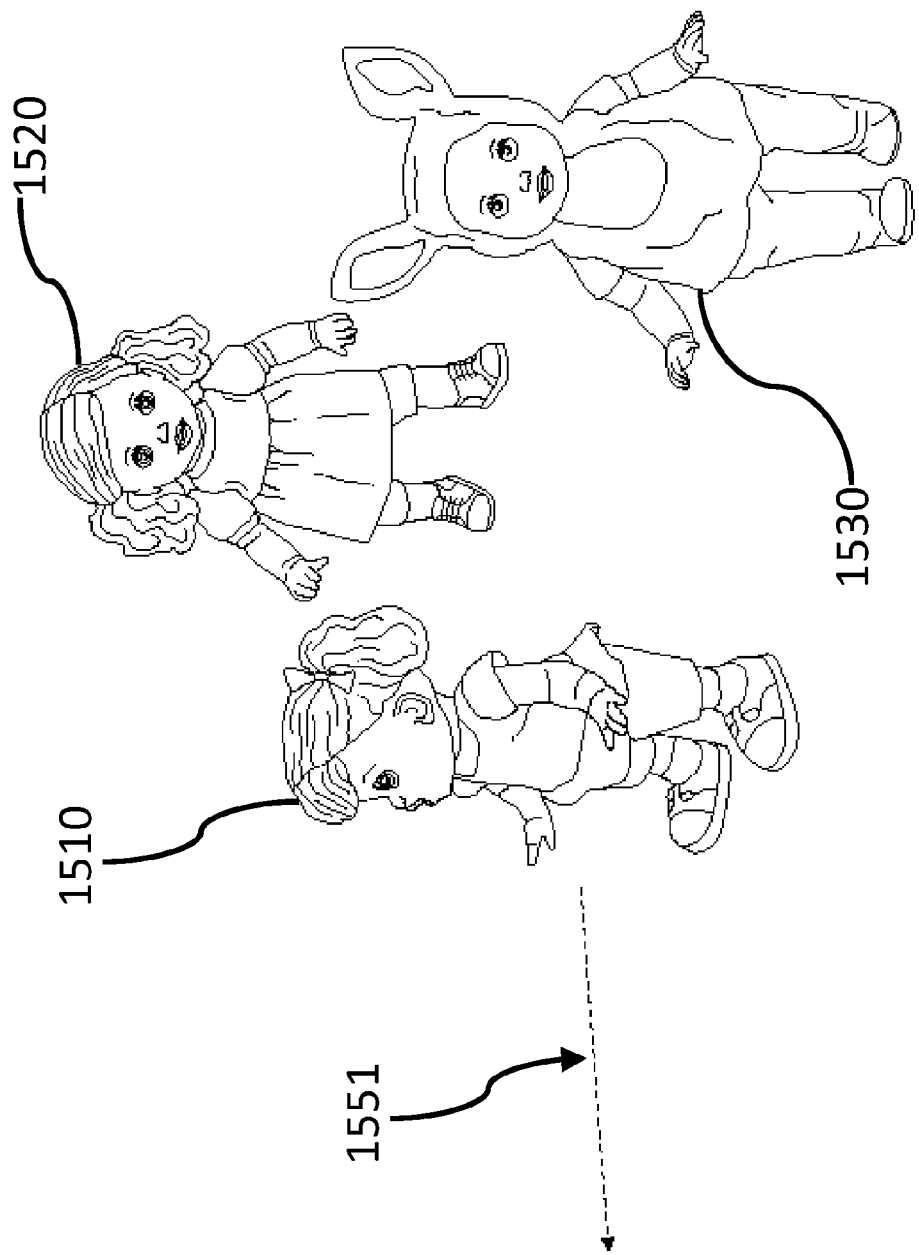
FIG. 15 illustrates an example retreat of a first toy relative to second and third toys.

FIG. 15 illustrates another example scenario in which RSSIs change among two or more transceivers. Toy 1510 and its corresponding transceiver retreats, as indicated by arrow 1551, away from toys 1520 and 1530 and their corresponding transceivers. RSSI values recorded between toy 1510 and either or both of toys 1520 and 1530 decrease as toy 1510 retreats. As such, the state of toy 1510 may be established as "retreating."

Figure 16:
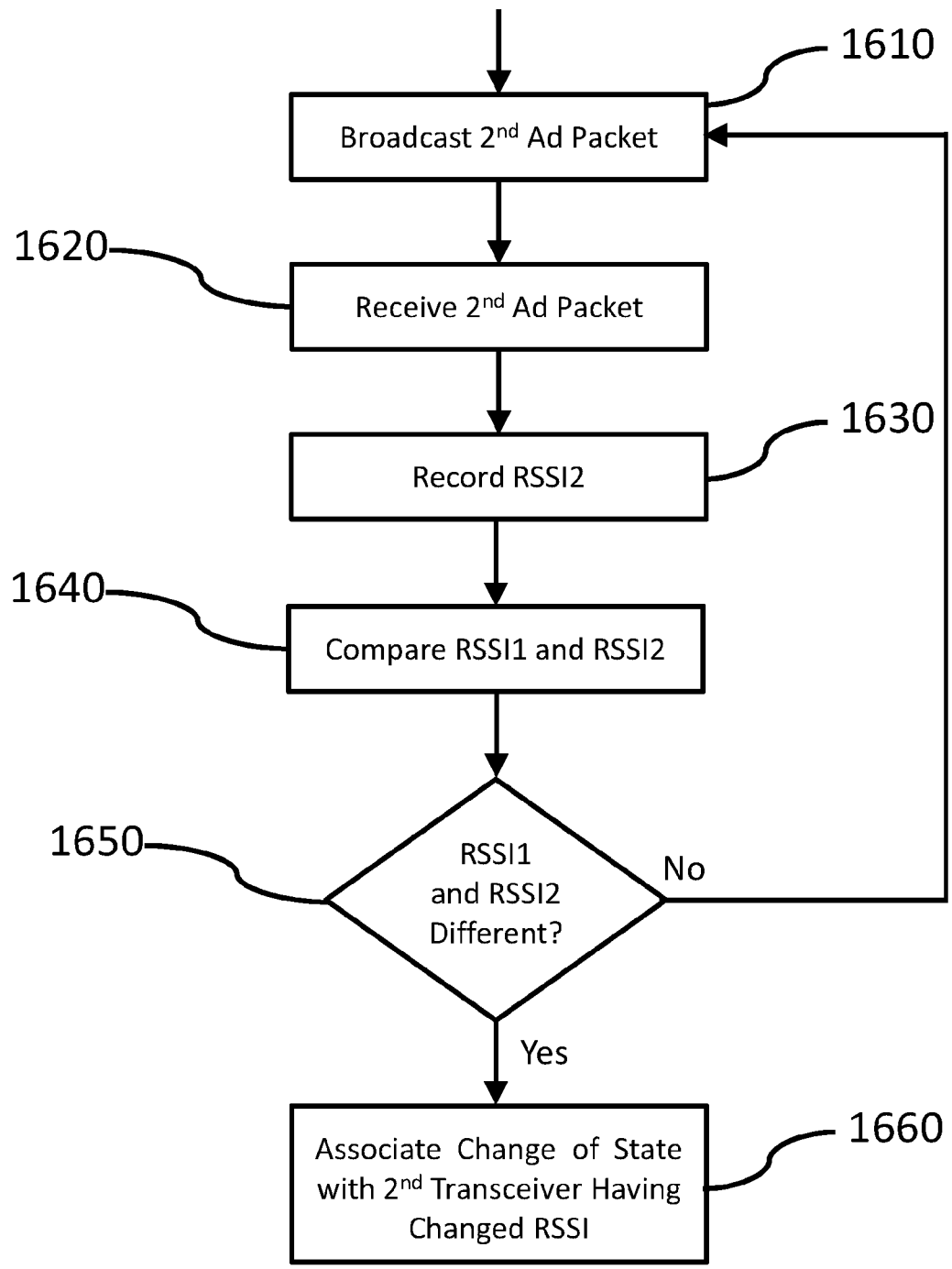
FIG. 16 illustrates a flow diagram of another example method for state tracking and an associated state change in accordance with disclosed embodiments.

FIG. 16 illustrates a flow diagram of another example method for state tracking and an associated state change in accordance with disclosed embodiments. The example method includes broadcasting a second advertising packet from the first transceiver at 1610; receiving, by the plurality of second transceivers, the second advertising packet at 1620; recording at 1630, for each of the plurality of second transceivers, an RSSI value of the second advertising packet received; and comparing the RSSI value recorded for the first advertising packet to the RSSI value recorded for the second advertising packet at 1640. When, for one of the plurality of second transceivers, the RSSI value recorded for the second advertising packet is different, by some threshold amount, from the RSSI value recorded for the first advertising packet according to 1650, a state is associated with the second transceiver for which the different RSSI value was recorded according to action 1660. If no difference is observed, transceivers continue to broadcast advertising packets. It should be noted that the method illustrated in FIG. 16, offers a simplified explanation of what may happen in practice. Since RSSI values are noisy, comparing consecutively recorded values may result in "false positive" state changes between transceivers. To correct for noise, RSSI values may be filtered over a number of cycles before any comparisons are made. For example, a vector of RSSI values being broadcast may reflect RSSI values from repeated advertisements that have been filtered. Furthermore, multiple vectors of filtered RSSI values may be combined with one another and historical data streams of other transceivers to create further filtered data.

Figure 17:
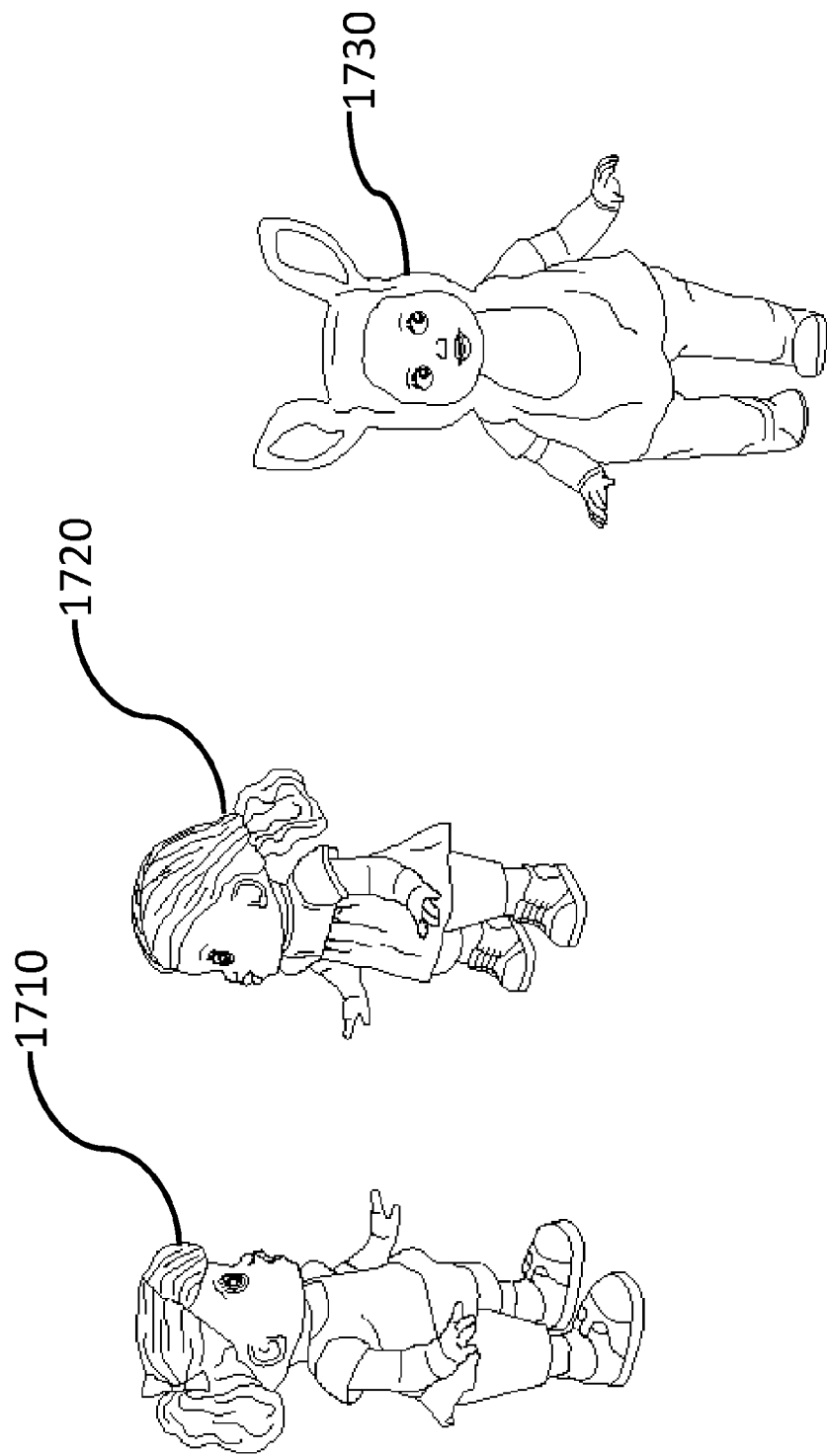
FIG. 17 illustrates example first and second toys facing towards one another while an example third toy faces away from the first and second toys.

FIG. 17 illustrates example first 1710 and second 1720 toys facing towards one another while an example third toy 1730 faces away from the first 1710 and second 1720 toys. In an example, objects having transceivers such as toys 1710, 1720 and 1730 include directional antennas configured to enable recognition of change in orientation of the objects. A directional antenna associated with toy 1710 and that associated with toy 1720 receive higher signal strength indications from one another than either does from toy 1730. Similarly, the directional antenna associated with toy 1730 receives a lower signal strength indication from both toy 1710 and toy 1720 than either the directional antenna associated with toy 1710 or the directional antenna associated with toy 1720 do from one another. The differences in RSSI values may be analyzed in order to establish affinity of toys 1710, 1720 and 1730.

Figure 18:
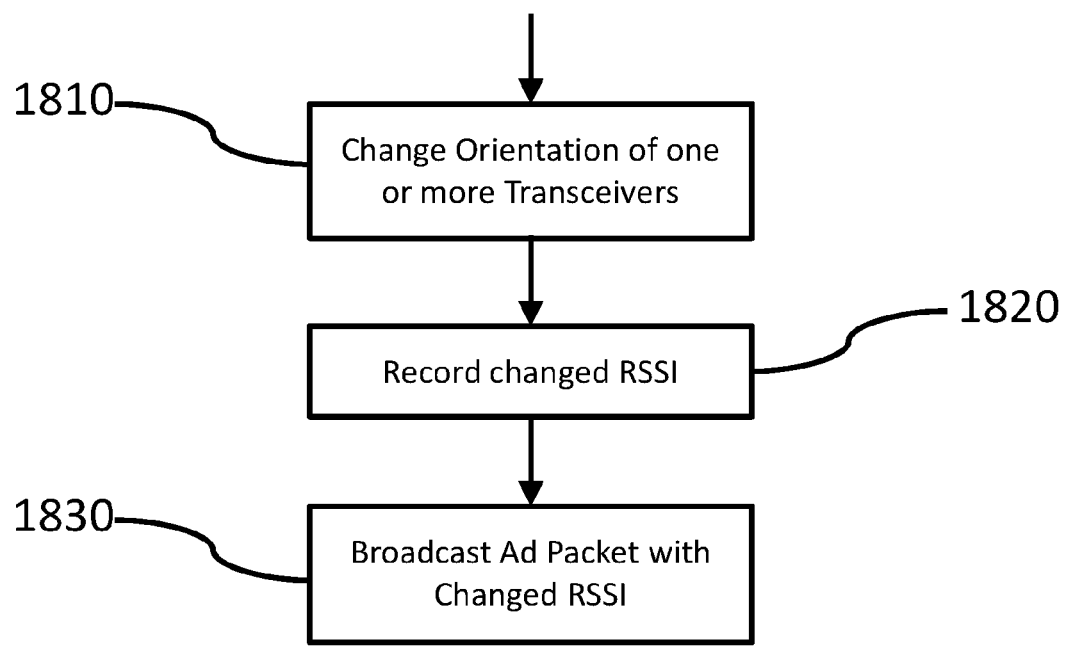
FIG. 18 illustrates a flow diagram of an example influence of an orientation change on RSSI and advertising packet broadcasting in accordance with disclosed embodiments.

After one or more advertising packets have been broadcast and received, moving transceivers affects the RSSI values received and thus affects later transmitted vectors and matrices. FIG. 18 illustrates a flow diagram of an example method for affinity tracking. At 1810, the orientation of one or more transceivers is changed. Orientation change may be the result of rotating or pivoting about one or more axes. When directional antennas are employed as part of disclosed state tracking methods and state tracking systems, a change in orientation in the absence of any other changes, results in a change in RSSI values received. The changed RSSI values are recorded at 1820. After the changed RSSI values have been recorded, one or more new advertising packets are broadcast at 1830 to reflect the changed RSSI values.

In an example, which attendees of a social engagement have interacted with one another is tracked in real time. In a crowded room, two attendees may be proximally close to one another but not facing one another. Orientation may provide additional insights. When directional antennas are used, transmission and reception are stronger between transceivers/attendees oriented face to face than those oriented away or partially away from one another.

Figure 19:
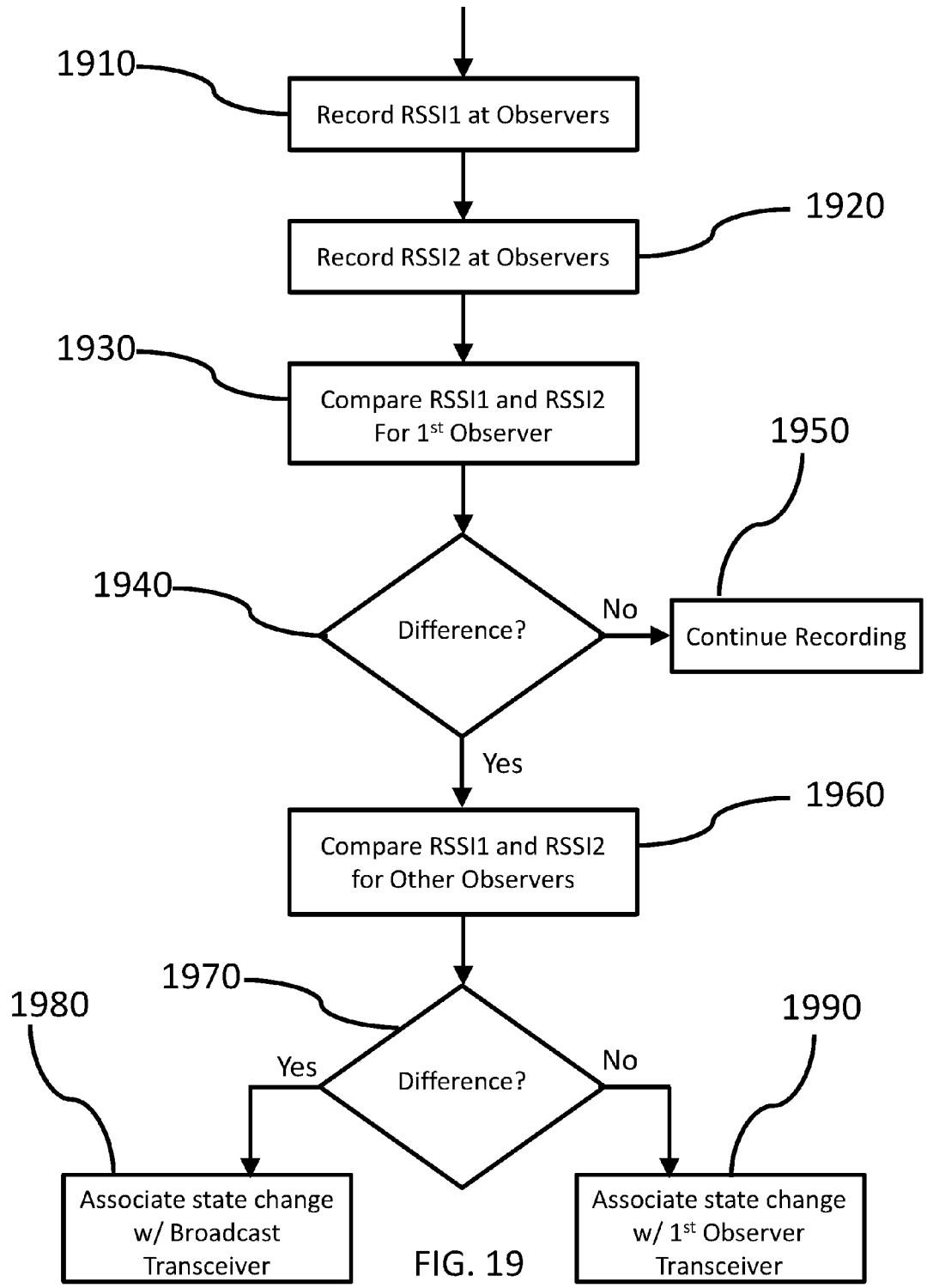
FIG. 19 illustrates a flow diagram of an example method for state tracking and verifying movement of a transceiver in accordance with disclosed embodiments.

As mentioned above, a filter could be implemented to detect which transceiver is retreating from which or which transceiver is approaching which other transceiver or transceivers when two transceivers apparently get closer together. The stationary transceiver of the pair should have similar RSSI readings relative to all other transceivers except the transceiver moving closer or farther away and the transceiver that is approaching or retreating should have some level of RSSI difference evolving between itself and all transceivers. FIG. 19 illustrates a flow diagram of an example method for state tracking and verifying movement of a transceiver in accordance with disclosed embodiments.

The example method includes at 1910, for each of a plurality of observing transceivers, individually recording the RSSI value of a first advertising packet from a broadcasting transceiver; for each of the plurality of observing transceivers, individually recording the RSSI value of a subsequent advertising packet from the broadcasting transceiver at 1920; and, according to 1930, making a first comparison of the RSSI value recorded between the broadcasting transceiver and a first of the plurality of observing transceivers for the first broadcast advertising packet with the RSSI value recorded between the broadcasting transceiver and the first of the plurality of observing transceivers for a subsequently broadcast advertising packet.

If no difference is observed at 1940, subsequent advertising packets are broadcast and received at 1950. When the comparison reveals a difference at 1940, a second comparison is made, according to action 1960, between the RSSI value recorded between the broadcasting transceiver and a second of the plurality of observing transceivers for the first broadcast advertising packet with the RSSI value recorded between the broadcasting transceiver and the second of the plurality of observing transceivers for the subsequently broadcast advertising packet.

When a difference is revealed at 1970, a state is associated with the broadcasting transceiver in accordance with action 1980. When the second comparison at 1970 reveals no difference, a state is associated with the first observing transceiver at 1990. The associated state may result in one or more sounds being emitted from an audio speaker associated with the transceiver such as audio speaker 250*b*. After either action 1980 or 1990, recording of RSSI values is continued. In practice, the example comparisons described with reference to FIG. 19 are made for all pair-wise combinations of transceivers implemented in a state tracking service and RSSI values recorded for subsequent broadcasts from the observers when in broadcasting mode are used symmetrically with RSSI values recorded by the first broadcasting node when taking on the role of an observer.

The disclosed actions of the methods described with reference to FIGS. 6, 10, 16, 18 and 19 are only illustrative and other alternatives can also be provided where one or more actions are added, one or more actions are removed, or one or more actions are provided in a different sequence without departing from the scope of the claims herein.

Embodiments of the present disclosure encompass providing a computer program product that includes a non-transitory or non-transient computer-readable storage medium storing computer-executable code for a state tracking service. The code, when executed, is configured to perform the actions of the methods as described in conjunction with FIGS. 6, 10, 16, 18 and 19. As actions of the disclosed methods may be provided in different sequences, so the computer-executable code may be configured to provide a service having a different sequence of actions from those illustrated in FIGS. 6, 10, 16, 18 and 19. In some examples, the code may be downloaded from a software application store, for example, from an "App store", to a computing device.

Embodiments of the present disclosure are susceptible to being used for various purposes, including, though not limited to, enabling users to track state to support actions between objects in accordance with their relative states.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for state tracking, comprising:
   broadcasting a first advertising packet from a first transceiver;
   receiving, by a plurality of second transceivers without establishing a paired connection with the first transceiver, the first advertising packet;
   by each of the plurality of second transceivers, recording a received signal strength indication value of the first advertising packet received;
   forming a subsequent advertising packet comprising the received signal strength indication value recorded by at least one of the plurality of second transceivers;
   broadcasting the subsequent advertising packet from the at least one of the plurality of second transceivers;
   receiving, by the first transceiver, the subsequent advertising packet;
   for the first transceiver, recording a received signal strength indication value of the subsequent advertising packet;
   combining the received signal strength indication value recorded for the at least one of the plurality of second transceivers with the received signal strength indication value recorded for the first transceiver to form a first value reflecting a state between the transceivers;
   broadcasting a second advertising packet from the first transceiver;
   receiving, by the at least one of the plurality of second transceivers, the second advertising packet;
   for the at least one of the plurality of second transceivers, recording a received signal strength indication value of the second advertising packet received;
   combining received signal strength indication value of the second advertising packet received with the first value reflecting a state between the transceivers to form a second value reflecting a state between the transceivers;
   comparing the first value to the second value; and
   when the first value differs from the second value by a minimum amount, associating a state change between the transceivers.

2. The method as set forth in claim 1, further comprising: for each recorded received signal strength indication value, associating a relative state between the first transceiver and the second transceiver for which the received signal strength indication value was recorded.

3. The method as set forth in claim 2, wherein the relative state comprises a proximity between the first transceiver and the second transceiver for which the received signal strength indication value was recorded.

4. The method as set forth in claim 2, wherein the relative state comprises an affinity between the first transceiver and the second transceiver for which the received signal strength indication value was recorded.

5. The method as set forth in claim 1, wherein associating a state change further comprises producing sound with an audio speaker associated with the second transceiver.

6. The method as set forth in claim 1, wherein broadcasting the first advertising packet from the first transceiver further comprises identifying the first transceiver within a custom data payload of the first advertising packet.

7. The method as set forth in claim 1, further comprising: in response to a change of orientation of one or more of the first transceiver or the plurality of second transceivers, recording changed received signal strength indication values for one or more of the first transceiver or the plurality of second transceivers.

8. A system for state tracking, comprising:
   a first transceiver configured to broadcast a first advertising packet;
   a plurality of second transceivers each configured to receive the first advertising packet and to broadcast subsequent advertising packets without establishing a paired connection between the first transceiver and any of the second transceivers;

a memory configured to record, for each of the plurality of second transceivers, a received signal strength indication value of the first advertising packet received; and a plurality of processors configured to:

form the subsequent advertising packets so as to comprise the received signal strength indication value recorded by at least one of the plurality of second transceivers;

the first transceiver being further configured to receive the subsequent advertising packet and broadcast a second advertising packet;

the memory being further configured to record, for the first transceiver, a received signal strength indication value of the subsequent advertising packet; and the processors being further configured to combine the received signal strength indication value recorded for the at least one of the plurality of second transceivers with the received signal strength indication value recorded for the first transceiver to form a first value reflecting a state between the transceivers;

the at least one of the plurality of second transceivers being further configured to receive the second advertising packet;

the memory being further configured to record, for the at least one of the plurality of second transceivers, a received signal strength indication value of the second advertising packet; and at least one of the processors being further configured to:

combine the received signal strength indication value of the second advertising packet with the first value reflecting a state between the transceivers to form a second value reflecting a state between the transceivers, compare the first value with the second value, and, when the first value differs from the second value by a minimum amount, associate a state change between the transceivers.

9. The system as set forth in claim 8, wherein the processors are further configured to, for each recorded received signal strength indication value, associate a relative state between the first transceiver and the second transceiver for which the received signal strength indication value was recorded.

10. The method as set forth in claim 9, wherein the state comprises a proximity between the first transceiver and the second transceiver for which the received signal strength indication value was recorded.

11. The method as set forth in claim 9, wherein the relative state comprises an affinity between the first transceiver and the second transceiver for which the received signal strength indication value was recorded.

12. The system as set forth in claim 8, further comprising an audio speaker associated with the plurality of transceivers and wherein at least one of the processors, in being configured to associate a state change, is further configured to produce sound with the audio speaker associated with the second transceiver.

13. The system as set forth in claim 8, wherein the first advertising packet is configured to identify the first transceiver within a custom data payload of the first advertising packet.

14. The system as set forth in claim 8, further comprising a directional antenna associated with one or more of the first transceiver and the plurality of second transceivers wherein the memory is configured to, in response to a change of orientation of one or more of the directional antennas, record changed received signal strength indication values for one or more of the first transceiver or the plurality of second transceivers.

* * * * *